US 11,680,179 B2

(12) United States Patent
Kikutsuji et al.

(10) Patent No.: US 11,680,179 B2
(45) Date of Patent: Jun. 20, 2023

(54) ULTRAVIOLET CURABLE INKJET INK SET AND PRODUCTION METHOD OF PRINTED MATTER

(71) Applicants: TOYO INK SC HOLDINGS CO., LTD., Tokyo (JP); TOYOCOLOR CO., LTD., Tokyo (JP)

(72) Inventors: Gosuke Kikutsuji, Tokyo (JP); Yohei Konda, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 17/634,358

(22) PCT Filed: Aug. 11, 2021

(86) PCT No.: PCT/JP2021/029665
§ 371 (c)(1),
(2) Date: Feb. 10, 2022

(87) PCT Pub. No.: WO2022/137635
PCT Pub. Date: Jun. 30, 2022

(65) Prior Publication Data
US 2022/0372319 A1 Nov. 24, 2022

(30) Foreign Application Priority Data

Dec. 25, 2020 (JP) .............................. JP2020-216784

(51) Int. Cl.
*C09D 11/40* (2014.01)
*B41M 5/00* (2006.01)
(Continued)

(52) U.S. Cl.
CPC ................ *C09D 11/40* (2013.01); *B41J 2/01* (2013.01); *B41J 2/21* (2013.01); *B41M 5/0023* (2013.01); *B41M 7/0081* (2013.01); *C09D 11/101* (2013.01); *C09D 11/107* (2013.01); *C09D 11/38* (2013.01); *C09D 11/54* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

2001/0020964 A1* 9/2001 Irihara ................... B41J 2/2114
347/43
2003/0016269 A1* 1/2003 Sekiya ..................... B41J 2/155
347/42
(Continued)

FOREIGN PATENT DOCUMENTS

JP 2009-083267 A 4/2009
JP 2011-218794 A 11/2011
(Continued)

OTHER PUBLICATIONS

International Search Report of PCT/JP2021/029665 dated Oct. 26, 2021 [PCT/ISA/210].
Written Opinion of PCT/JP2021/029665 dated Oct. 26, 2021 [PCT/ISA/237].

*Primary Examiner* — Manish S Shah
(74) *Attorney, Agent, or Firm* — Sughrue Mion, PLLC

(57) ABSTRACT

By the use of an ultraviolet curable inkjet ink set for a line head printer comprising a lower layer ink containing a polymerizable monomer having a specific structure, and, a specific photopolymerization initiator, and an upper layer ink containing a polymerizable monomer having a specific structure and a specific photopolymerization initiator, wherein among the lower layer ink and the upper layer ink, one of the inks is a white ink and the other ink is a black ink, a good printed matter having excellent adhesion between a recording medium and the ink layer, and, between different ink layers can be obtained without generating curing wrinkles and curling over time even during high speed printing.

17 Claims, No Drawings

(51) Int. Cl.
*B41M 7/00* (2006.01)
*C09D 11/101* (2014.01)
*C09D 11/107* (2014.01)
*C09D 11/38* (2014.01)
*C09D 11/54* (2014.01)
*B41J 2/01* (2006.01)
*B41J 2/21* (2006.01)

(56) References Cited

U.S. PATENT DOCUMENTS

| | | | |
|---|---|---|---|
| 2005/0093952 A1* | 5/2005 | Hoshino | B41J 11/00214 347/102 |
| 2009/0073197 A1* | 3/2009 | Hoshino | B41J 11/00214 347/6 |
| 2009/0085996 A1* | 4/2009 | Kasai | B41M 5/0011 347/100 |
| 2010/0302300 A1* | 12/2010 | Verdonck | B41J 2/205 347/17 |
| 2011/0234680 A1 | 9/2011 | Aoyama et al. | |
| 2012/0147095 A1* | 6/2012 | Miura | B41J 11/0015 347/102 |
| 2013/0222497 A1* | 8/2013 | Nakano | B41J 2/2114 347/100 |
| 2013/0303682 A1* | 11/2013 | Konda | C09D 11/101 524/548 |
| 2017/0114239 A1 | 4/2017 | Fujiwara et al. | |
| 2018/0244942 A1 | 8/2018 | Tsuyama et al. | |

FOREIGN PATENT DOCUMENTS

| | | |
|---|---|---|
| JP | 2013-177530 A | 9/2013 |
| JP | 2013-240978 A | 12/2013 |
| JP | 2015-063064 A | 4/2015 |
| JP | 2015-113434 A | 6/2015 |
| JP | 2015-183147 A | 10/2015 |
| JP | 2015-183148 A | 10/2015 |
| JP | 2017-179006 A | 10/2017 |
| WO | 2017/086224 A1 | 5/2017 |
| WO | 2020/049378 A1 | 3/2020 |

* cited by examiner

ULTRAVIOLET CURABLE INKJET INK SET AND PRODUCTION METHOD OF PRINTED MATTER

CROSS REFERENCE TO RELATED APPLICATIONS

This application is a National Stage of International Application No. PCT/JP2021/029665, filed Aug. 11, 2021, claiming priority to Japanese Patent Application No. 2020-216784, filed Dec. 25, 2020.

TECHNICAL FIELD

The present invention relates to an ultraviolet curable inkjet ink set, and, a production method of a printed matter which uses the inkjet ink set.

BACKGROUND ART

Accompanying the decrease in printing lot size and the diversification of needs, the prevalence of digital printing methods has rapidly advanced. A plate is not required with digital printing methods, thus, it is possible to reduce costs and reduce the size of printing equipment.

The inkjet printing method which is one type of digital printing method is a method in which very fine liquid droplets of ink are jetted from an inkjet head and deposited onto a recording medium (substrate) and form images or text on the recording medium to obtain a recorded item (hereinafter, referred to as the "printed matter"). Compared with other digital printing methods, the inkjet printing method is superior from viewpoints such as the size and cost of the printing apparatus, the running costs during printing, and the ease of making full color printed matters. In recent years, the inkjet printing method has been increasingly used in industrial printing applications.

There are various types of inks used in the inkjet printing method such as aqueous-based, oil-based, solvent-based and, ultraviolet curable, but the demand for active energy ray-curable inkjet inks has been increasing due to characteristics such as the speed of the drying time and the strength of the cured film forming the print layer.

Further, in recent years, inkjet head innovation has progressed, and inkjet heads which can discharge at high frequencies of 30 kHz or more have been put on the market. Furthermore, an ultraviolet curable inkjet line printer which can print at a higher speed than before by setting these inkjet heads so as to be longer than the width of a recording medium, and completing the printing with one discharge has also been put on the market.

With ultraviolet curable inkjet line printers, as the printing speed increases, the integrated light quantity of the ultraviolet rays irradiated to the ink deposited on the recording medium decreases. Specifically, when printing at speeds in excess of 50 m/minute, curing failure of the ink may occur.

A method for disposing a small ultraviolet ray irradiation means on the downstream side on each of a plurality of inkjet heads mounted on the inkjet line printer may be utilized as a method for compensating for such curing failures during high speed printing (refer to Patent Documents 1 and 2). In this method, after each ink discharged from the plurality of inkjet heads was deposited onto the recording medium, ultraviolet rays are irradiated from the ultraviolet ray irradiation means to partially cure the ink on the recording medium prior to the next ink being deposited (temporary curing). Moreover, after all of the inks are deposited onto the recording medium, ultraviolet rays are irradiated from a separate ultraviolet rays curing means, and all of the inks are cured together (final curing).

When using an inkjet line printer having this kind of structure to perform high speed printing in excess of 50 m/minute, it becomes very difficult to control the aforementioned temporary curing and the aforementioned final curing.

For example, if the ink initially imparted onto the recording medium was not sufficiently cured by the temporary curing, in some cases in which, even after the final curing was performed, the curing of the aforementioned ink initially imparted onto the recording medium will be insufficient, thus, the adhesion to the recording medium will be insufficient. Further, the degree of curing varies greatly between the ink initially imparted onto the recording medium and the ink imparted onto the recording medium later, thus, the problems that wrinkles appear at the boundary portion of two types of ink and the printed matter curls may occur.

Conversely, if the ink initially imparted onto the recording medium is cured too much by the temporary curing, peeling (delamination) may occur between the layer of the ink initially imparted onto the recording medium and the layer of the ink imparted to the recording medium later. Further, in order for the curing by temporary curing to proceed, the problem that the ink layer turns yellow (yellowing) may occur by excessively blending the photopolymerization initiator.

Note that, Patent Document 1 actually performed an evaluation using a set of a white ink and a cyan ink, but when the present inventors reproduced the ink set described in Patent Document 1 and performed the evaluation at the printing speed of 50 m/minute, it was not possible to obtain a printed matter having excellent quality due to poor adhesion to the recording medium and curling over time.

PRIOR ART DOCUMENTS

Patent Documents

[Patent Document 1]: JP 2011-218794 A
[Patent Document 2]: JP 2013-240978 A

SUMMARY OF THE INVENTION

Problems Invention Aims to Solve

In order to solve the aforementioned problems, it is the object of the present invention to provide an ultraviolet curable inkjet ink set for a line head printer which can obtain a good printed matter having excellent adhesion between a recording medium and an ink layer and adhesion between different ink layers without generating curing wrinkles or curling over time even during high speed printing. Further, another object of the present invention is to provide a method for producing a printed matter having the aforementioned characteristics by use of the aforementioned ultraviolet curable inkjet ink set.

Means for Solution of the Problems

In consideration of the aforementioned situation, the present inventors performed keen research, and as a result, discovered that the aforementioned problems can be solved by an ultraviolet curable inkjet ink set (hereinafter, referred to simply as the "ink set") having the following configuration, and completed the present invention.

Namely, an embodiment of the present invention relates to an ultraviolet curable inkjet ink set comprising a lower layer ink and an upper layer ink, and used in a line pass inkjet printer having a temporary curing step, wherein among the lower layer ink and the upper layer ink, one of the inks is a white ink, and the other ink is a black ink, the lower layer ink contains a polymerizable monomer (DA), a photopolymerization initiator (DB), and a colorant (DC), the polymerizable monomer (DA) comprises the compound represented by the following General formula (A), the photopolymerization initiator (DB) contains an acylphosphine oxide photopolymerization initiator (DB-1), a benzophenone photopolymerization initiator (DB-2), and a 2-hydroxy-1-{1-[4-(2-hydroxy-2-methylpropionyl) phenyl]-1,3,3-trimethylindane-5-yl}-2-methylpropane-1-one (DB-3), the upper layer ink contains a polymerizable monomer (UA), a photopolymerization initiator (UB), and a colorant (UC), the polymerizable monomer (UA) comprises the compound represented by the following General formula (A), and the photopolymerization initiator (UB) contains an acylphosphine oxide photopolymerization initiator (UB-1) and a benzophenone photopolymerization initiator (UB-2).

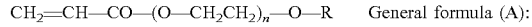

General formula (A): $CH_2=CH-CO-(O-CH_2CH_2)_n-O-R$ (In General formula (A), R represents an acryloyl group or a vinyl group, and n represents an integer from 2 to 10.

Further, the compound represented by General formula (A) in the polymerizable monomer (DA) and the compound represented by General formula (A) in the polymerizable monomer (UA) may be the same or different.)

Further, another embodiment of the present invention relates to the aforementioned ultraviolet curable inkjet ink set wherein R of the compound represented by General formula (A) in the polymerizable monomer (DA), and R of the compound represented by General formula (A) of the polymerizable monomer (UA) are both vinyl groups.

Further, another embodiment of the present invention relates to the aforementioned ultraviolet curable inkjet ink set wherein the upper layer ink further contains a photopolymerization initiator (UB-4) having an amino group.

Further, another embodiment of the present invention relates to the aforementioned ultraviolet curable inkjet ink set, wherein the lower layer ink is substantially free of a thioxanthone-based photopolymerization initiator, and, a photopolymerization initiator having an amino group.

Further, another embodiment of the present invention relates to a production method of the printed matter which uses the aforementioned ultraviolet curable inkjet ink set, comprising Step 1 for discharging and imparting the lower layer ink on a substrate, Step 2 for irradiating an ultraviolet ray from an ultraviolet light emitting diode to the substrate imparted with the lower layer ink obtained in Step 1, Step 3 for discharging and imparting the upper layer ink to the substrate imparted with the lower layer ink obtained in Step 2 in order to at least partially overlap with the lower layer ink, and Step 4 for irradiating an ultraviolet ray from an ultraviolet lamp to the substrate imparted with the lower layer ink and the upper layer ink obtained in Step 3.

Effects of the Invention

The embodiment of the present invention can provide an ultraviolet curable inkjet ink set for a line head printer which can obtain a good printed matter having excellent adhesion between a recording medium and an ink layer and adhesion between different ink layers without generating curing wrinkles or curling over time even during high speed printing. Further, the embodiment of the present invention can provide a method for producing a printed matter having the aforementioned characteristics by use of the aforementioned ultraviolet curable inkjet ink set.

EMBODIMENTS FOR CARRYING OUT THE INVENTION

[Active Energy Ray-Curable Inkjet Ink Set]

In a line pass inkjet printer, the ink (lower layer ink) disposed on the most upstream side has a large area which is in contact with the recording medium, thus, a high adhesion to the recording medium is sought. Further, adhesion with the layer of the ink (upper layer ink) laminated on the lower layer ink is also necessary. Furthermore, if the difference in the degree of curing between the lower layer ink and the upper layer ink is large, there is the risk that defects will occur such as the occurrence of curing wrinkles, and the laminate (printed matter) will curl over time. As a method for avoiding such problems, a method for performing a temporary curing step which irradiates an active energy ray from an ultraviolet light emitting diode and the like after the lower layer ink was discharged is known.

On the one hand, an active energy ray-curable inkjet ink constituting the inkjet set ink generally contains a pigment, a photopolymerization initiator, a polymerizable monomer, and other additives. By such a design, it is important that the formulation of the photopolymerization initiator is suitable for the wavelength of the active energy ray which is used with the inkjet ink.

Generally, a light-emitting diode which irradiates relatively long wavelength ultraviolet rays is used in the aforementioned temporary curing step. As a photopolymerization initiator suitable for this kind of ultraviolet light emitting diode, thioxanthones and α-amino alkylphenones are known. However, when formulated with the aforementioned thioxanthones and α-amino alkylphenones, defects such as the ink film becoming a yellow color, and the outer appearance of the printed matter becoming damaged occur. Further, specifically, when formulating thioxanthones and α-amino alkylphenones in white inks and black inks where the active energy ray does not pass through to the inside, there is the risk that a difference in the degree of curing will be produced at the ink film surface and on the inside, and curing wrinkles and curling will occur.

Therefore, when a white ink and a black ink were used in a line pass inkjet printer, satisfying all of the characteristics such as the adhesion to the recording medium, the adhesion between ink layers, curing wrinkles, curling over time, and, yellow coloring to a practical level would be a large problem for a person having ordinary skill in the art.

To this effect, the present inventors performed keen research, and as a result, discovered that an ink set consisting of a lower layer ink containing the compound represented by the following General formula (A) as the polymerizable monomer (DA), and containing as a photopolymerization initiator (DB), an acylphosphine oxide photopolymerization initiator (DB-1), a benzophenone photopolymerization initiator (DB-2), and 2-hydroxy-1-{1-[4-(2-hydroxy-2-methylpropionyl) phenyl]-1,3,3-trimethylindane-5-yl}-2-methyl-propane-1-one (DB-3), and an upper layer ink containing the compound represented by the following General formula (A) as a polymerizable monomer (UA), and containing as a photopolymerization initiator (UB), an acylphosphine oxide photopolymerization initiator (UB-1), and a benzophenone photopolymerization initiator (UB-2), wherein among the aforementioned the lower layer ink and the upper layer ink, one of the inks is a white ink and the other ink is a black ink simultaneously solves all of the aforementioned problems.

The reason for this has not been determined, but it is considered to be due to the following reasons. First, the acylphosphine oxide photopolymerization initiator (DB-1) which has a wide absorption wavelength region absorbs the active energy ray irradiated at the temporary curing step and generates a radical by performing the temporary curing step after the lower layer ink was printed on the recording medium. The radical is mainly on the inside of the ink film, and is used in the polymerization reaction of the polymerizable monomer in the lower layer ink, and as a result, it is considered that the adhesion to the recording medium improves. Further, the ethylene oxide group included in the compound represented by General formula (A) and contained in the lower layer ink, and a functional group such as the hydroxyl group of the recording medium surface form a hydrogen bond, thus, it is assumed that the adhesion between the lower layer ink and the recording medium will further improve.

On the other hand, it is considered that the radical generated from the acylphosphine oxide photopolymerization initiator (DB-1) is also used in the cleavage of the benzophenone photopolymerization initiator (DB-2) and 2-hydroxy-1-{1-[4-(2-hydroxy-2-methylpropionyl) phenyl]-1,3,3-trimethylindane-5-yl}-2-methylpropane-1-one (DB-3) present in the lower layer ink and the generation of the radical. Specifically, it is considered that a hydroxy radical generated from the aforementioned photopolymerization initiator effectively and rapidly reacts with the compound represented by General formula (A) contained in the lower layer ink, and polymerization proceeds. Therefore, it is thought that even with the white ink and the black ink where the active energy ray does not easily pass through to the inside, the polymerization reaction proceeds effectively and curing occurs.

Subsequently, the upper layer ink is printed on the lower layer ink layer which has been subjected to the temporary curing step. At this time, it goes without saying that the adhesion between the lower layer ink layer and the upper layer ink layer is important. On the other hand, the adhesion between the lower layer ink layer and the recording medium improves, thus, if the lower layer ink is completely cured during the temporary curing step, the adhesion between the ink layers may deteriorate. Conversely, the adhesion between the lower layer ink layer and the upper layer ink layer improves, thus, when the curing of the lower layer ink is insufficient in the temporary curing step, the degree of curing between the lower layer ink and the upper layer ink changes greatly, and there is the risk that curing wrinkles and curling over time will be generated after the final curing. Therefore, it is not easy to solve the aforementioned problems simultaneously.

(Ink)

In the embodiment of the present invention, the lower layer ink and the upper layer ink (hereinafter, these are simply referred to as the "ink") both contain a compound represented by General formula (A) as the polymerizable monomer. The compound represented by General formula (A) has a plurality of ethylene oxide groups, thus, it is thought that interactions such as hydrogen bonds limit the movement of the compound molecule in the ink and the progression of the reaction, and the compound takes some time to be completely consumed by the polymerization reaction. As a result, it is thought that it is possible to impart the upper layer ink before the compound in the lower layer ink is completely consumed and sufficiently maintain the curability during the temporary curing step of the lower layer ink, while being able to realize crosslinking with the upper layer ink layer to be printed thereafter. Further, the lower layer ink and the upper layer ink contain the same type of monomers, thus, the affinity is high. This is also considered to contribute to the prevention of adhesion defects between the ink layers.

Furthermore, the lower layer ink and the upper layer ink both contain the acylphosphine oxide photopolymerization initiator and the benzophenone photopolymerization initiator. As stated above, it is known that the acylphosphine oxide photopolymerization initiator is generally effective at curing of the inside of an ink film, but in addition thereto, in the embodiment of the present invention, it was found that the use with the benzophenone photopolymerization initiator further results in the contribution to the prevention of curing wrinkles, and, the adhesion between the lower layer ink layer and the upper layer ink layer. Generally, it is known that a benzophenone photopolymerization initiator generates the radical using an amine-based coinitiator, and is effective in the curing of an ink film surface. In the case of the embodiment of the present invention, as stated above, it is thought that the hydroxyl radical generated from the benzophenone photopolymerization initiator is generated due to the radical generated from the acylphosphine oxide photopolymerization initiator, and the prevention of curing wrinkles and the improvement of the adhesion between the ink layers can be brought about by the hydroxyl radical reacting rapidly with the compound represented by General formula (A).

In addition, as stated above, during printing of the upper layer ink, the lower layer ink is not completely cured, thus, it is necessary to completely cure the lower layer ink layer in the curing step after the upper layer ink was printed. On the other hand, one of the lower layer ink and the upper layer ink in the embodiment of the present invention is a white ink and the other ink is a black ink, and for both inks, it is difficult for the active energy ray to penetrate inside of the ink film, thus, there is the risk that complete curing of the lower layer ink will not occur. With regards thereto, by blending 2-hydroxy-1-{1-[4-(2-hydroxy-2-methylpropionyl) phenyl]-1,3,3-trimethylindane-5-yl}-2-methylpropane-1-one(DB-3) which is a polyfunctional photopolymerization initiator in the lower layer ink in the embodiment of the present invention, the complete curing of the lower layer ink is realized, and as a result, further improvement of the adhesion between the ink layers is attained.

In a line pass inkjet printer which uses 2 or more ultraviolet curable inkjet inks, even if the lower layer ink and the upper layer ink were sufficiently cured and crosslinked, the obtained printed matter may curl over time. It is thought that this is due to the shrinkage stress remaining in the ink layer as the curing shrinkage of the polymerizable monomer which was instantly polymerized was not relieved. With respect thereto, the printed matter containing the lower layer ink layer and the upper layer ink layer in the embodiment of the present invention has excellent curling over time. It is thought that the existence of the compound represented by General formula (A) is the reason for this phenomenon. As mentioned above, it is thought that the compound represented by General formula (A) takes some time to be completely consumed by the polymerization reaction, and a reaction with this time difference generates the time for relieving the shrinkage stress due to the previously reacted polymerizable monomer, and as a result, the shrinkage stress in the ink layer is thought to be relieved.

As described above, the configuration of the embodiment of the present invention is indispensable in order to obtain an active energy ray-curable inkjet ink set having all of the characteristics such as the adhesion between the recording medium and the first ink layer (lower layer ink layer), the adhesion between the first ink layer (lower layer ink layer) and the second ink layer (upper layer ink layer), the whiteness of the white ink, curing wrinkles in the laminated portion are not generated, and the curling over time is small.

Next, each component constituting the active energy ray-curable inkjet ink set of the embodiment of the present invention will be described below.

<Polymerizable Monomer>

The polymerizable monomer has the functions which cause a polymerization or a crosslinking reaction by an initiating species such as a radical generated from a photopolymerization initiator which will be described later, and which cures a composition comprising the polymerizable monomer.

As mentioned above, the lower layer ink and the upper layer ink of the ink set of the embodiment of the present invention both contain the compound represented by the following General formula (A) as the polymerizable monomer.

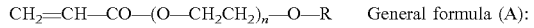

$$CH_2=CH-CO-(O-CH_2CH_2)_n-O-R \quad \text{General formula (A):}$$

In the aforementioned General formula (A), R represents an acryloyl group or a vinyl group, and n represents an integer from 2 to 10.

Further, the compound represented by General formula (A) in the polymerizable monomer (DA) and the compound represented by General formula (A) in the polymerizable monomer (UA) may be the same or different.

As mentioned above, use of the compound represented by General formula (A) can prevent adhesion defects between the lower layer ink layer and the recording medium, and, between the ink layers, and furthermore, it becomes possible to prevent curing wrinkles in the laminated portion and curling over time.

Diethylene glycol diacrylate, triethylene glycol diacrylate, polyethylene glycol (#200) diacrylate, polyethylene glycol (#300) diacrylate, polyethylene glycol (#400) diacrylate, 2-(2-vinyloxyethoxy)ethyl acrylate, 2-[2-(2-vinyloxyethoxy)ethoxy]ethyl acylate and the like may be used as the aforementioned compound represented by General formula (A).

In the embodiment of the present invention, the compound in which R in General formula (A) is a vinyl group can be preferably used as the aforementioned compound represented by General formula (A). The vinyl group is involved in the polymerization reaction slight later than the acryloyl group, thus, as stated above, it is considered that the effect of delaying the polymerization reaction which is thought to be caused by the presence of the ethylene oxide group is further enhanced. Further, when n in General formula (A) is the same, the viscosity of the compound in which R is a vinyl group is lower than the compound in which R is an acryloyl group. Therefore, use of the compound in which R is a vinyl group improves the wet spreadability on the recording medium, and improves the adhesion to the recording medium.

Among the aforementioned compound represented by General formula (A) exemplified above, 2-(2-vinyloxyethoxy)ethyl acrylate, 2-[2-(2-vinyloxyethoxy)ethoxy]ethyl acylate may be provided as the compound in which R in General formula (A) is a vinyl group, and for example, the polymerizable monomer (DA) and the polymerizable monomer (UA) may both be 2-(2-vinyloxyethoxy)ethyl acrylate.

In the embodiment of the present invention, the content of the aforementioned compound represented by General formula (A) is preferably 15 to 100% by mass relative to all the polymerizable monomers in the ink, more preferably 45 to 100% by mass, and particularly preferably 65 to 100% by mass.

Further, both the compound in which R in General formula (A) is a vinyl group and the compound in which the R in General formula (A) is an acryloyl group may be included as the aforementioned compounds represented by General formula (A). The amount of the compound in which R in General formula (A) is a vinyl group is preferably 75 to 100% by mass relative to the total amount of the compound represented by General formula (A) in the ink, and preferably 80 to 100% by mass.

The lower layer ink and the upper layer ink which constitutes the ink set of the embodiment of the present invention may also contain polymerizable monomers (hereinafter, referred to as the "other polymerizable monomers") other than the aforementioned compound represented by General formula (A).

The other polymerizable monomers are not specifically limited as long as they have characteristics of the aforementioned polymerizable monomer, and can be used regardless of the type of monomer, oligomer, or polymer. Specifically, in the embodiment of the present invention, a radical polymerizable monomer can be preferably used. Note that, the terms "oligomer" and "polymer" indicate polymers in which a plurality of monomers are bonded, and both are classified according to the degree of polymerization. Namely, in the present description, an "oligomer" is referred to as a compound in which the degree of polymerization is from 2 to 5, and a "polymer" is referred to as a compound in which the degree of polymerization is 6 or more.

Examples of the polymerizable group having a radical polymerizable monomer include a (meth)acryloyl group, a vinyl ether group, an allyl group, a vinyl group (however, the vinyl ether group and the allyl group are excluded), an unsaturated carboxylic acid group and the like. In the embodiment of the present invention, the radical polymerizable monomer may be a monofunctional compound, and may be a difunctional or more polyfunctional compound. Further, a single polymerizable monomer or a mixture of a plurality of polymerizable monomers may be used for the purpose of adjusting the reaction rate and the physical properties of the cured film and the ink. When the ratio of the monofunctional compound is high, the cured film tends to be flexible, and when the ratio of the polymerizable monomer is high, the curability tends to be excellent. Therefore, when using a plurality of polymerizable monomers, the ratio of the monofunctional compound and the polyfunctional compound is arbitrarily determined in accordance with the application.

Here, in the present description, descriptions such as "(meth)acrylate" and "(meth)acryloyl" respectively mean "acrylate and/or methacrylate" and "acryloyl and/or methacryloyl". Further, in the present description, the term "monofunctional" refers to a compound having only one polymerizable group in a molecule. Further the terms "difunctional" and "trifunctional" respectively refer to compounds having 2 or 3 polymerizable groups in a molecule, and compounds which are difunctional or more will be collectively referred to as "polyfunctional".

Examples of the monofunctional monomer which can be used as another polymerizable monomer include compounds having one (meth) acryloyl group such as benzyl (meth)acrylate, 2-phenoxyethyl (meth)acrylate, (ethoxylated or propoxylated) 2-phenoxyethyl (meth)acrylate, dicyclopentenyl (oxyethyl) (meth)acrylate, phenoxy diethylene glycol (meth)acrylate, 2-methoxethyl (meth)acrylate, methoxy triethylene glycol (meth)acrylate, 2-ethoxyethyl (meth)acrylate, 2-(2-ethoxyethoxy)ethyl (meth)acrylate, methoxy dipropylene glycol (meth)acrylate, dipropylene glycol (meth)acrylate, nonylphenol EO-modified acrylate, nonylphenol PO-modified acrylate, o-phenylphenol EO-modified acrylate, 2-ethylhexyl EO-modified acrylate, β-carboxyethyl (meth)acrylate, trimethylolpropane formal (meth)acrylate, isoamyl (meth)acrylate, cyclohexyl (meth)acrylate, tetrahydrofurfuryl (meth)acrylate, isobornyl (meth)acrylate, norbornyl (meth)acrylate, dicyclopentanyl (meth)acrylate, isononyl (meth)acrylate, stearyl (meth)acrylate, n-octyl acrylate, isooctyl (meth)acrylate, lauryl (meth)acrylate, isodecyl (meth)acrylate, tridecyl (meth)acrylate, caprolactone (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth)acrylate, 4-hydroxybutyl (meth)acrylate, acryloylmorpholine and N-acryloyloxyethyl hexahydrophthalimide. Further, N-vinylcaprolactam, N-vinylpyrrolidone and the like may be used as compounds having one vinyl group.

Further, examples of the difunctional monomer which can be used as another polymerizable monomer include compounds having two (meth) acryloyl groups such as 1,6-hexanediol di(meth)acrylate, ethoxylated (or propoxylated) 1,6-hexanediol di(meth)acrylate, 1,10-decanediol di(meth)acrylate, neopentyl glycol di(meth)acrylate, 2,4-dimethyl-1,5-pentanediol di(meth)acrylate, 3-methyl-1,5-pentanediol di(meth)acrylate, butylethylpropanediol (meth)acrylate, ethoxylated cyclohexanemethanol di(meth)acrylate, ethylene glycol di(meth)acrylate, 2-ethyl-2-butylbutanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, polyethylene glycol (#600) di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, propoxylated bisphenol A di(meth)acrylate, ethoxylated bisphenol A di(meth)acrylate, ethoxylated bisphenol F di(meth)acrylate, isocyanuric acid EO-modified diacrylate, tricyclodecane di(meth)acrylate, dipropylene glycol di(meth)acrylate, tripropylene glycol di(meth)acrylate, PO-modified neopentyl glycol di(meth)acrylate, EO-modified neopentyl glycol di(meth)acrylate, dimethyloltricyclodecane di(meth)acrylate, cyclohexanedimethanol di(meth)acrylate, trimethylolpropane di(meth)acrylate, neopentyl glycol-modified trimethylolpropane di(meth)acrylate and dicyclopentanyl di(meth)acrylate.

Further, examples of the trifunctional monomer which can be used as another polymerizable monomer include compounds having three (meth)acryloyl groups such as trimethylolpropane tri(meth)acrylate, trimethylolethane tri(meth)acrylate, alkylene oxide-modified tri(meth)acrylates of trimethylolpropane (such as trimethylolpropane EO-modified triacrylate and trimethylolpropane PO-modified triacrylate), tetramethylolmethane tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylates, propionic acid dipentaerythritol tri(meth)acrylate, tri((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, ethoxylated glycerol triacrylate and propoxylated glyceryl triacrylate. From the viewpoint of curability, trimethylolpropane triacrylate and trimethylolpropane EO-modified triacrylate are preferable.

Further, examples of the tetrafunctional monomer include compounds having four (meth)acryloyl groups such as pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate and tetramethylolmethane tetra(meth)acrylate. Thereamong, pentaerythritol tetraacrylate is preferable.

Further, examples of the pentafunctional monomer which can be used as another polymerizable monomer include compounds having five (meth)acryloyl groups such as sorbitol penta(meth)acrylate, dipentaerythritol penta(meth)acrylate, EO-modified dipentaerythritol penta(meth)acrylate.

Further, examples of the hexafunctional monomer which can be used as another polymerizable monomer include compounds having six (meth)acryloyl groups such as dipentaerythritol hexa(meth)acrylate, EO-modified dipentaerythritol hexa(meth)acrylate, sorbitol hexa(meth)acrylate, alkylene oxide-modified hexa(meth)acrylates of phosphazene, ε-caprolactone-modified dipentaerythritol hexa(meth)acrylate. Thereamong, dipentaerythritol hexaacrylate and EO-modified dipentaerythritol hexa(meth)acrylateare preferable.

Note that, in the present description, the term "EO" refers to "ethylene oxide" and the term "PO" refers to "propylene oxide".

Further, when using a radical-polymerizable monomer as the other polymerizable monomer, a monomer having a (meth)acryloyl group can be preferably used as the polymerizable group. From the viewpoint of the balance between the flexibility and the curability, the number of polymerizable groups contained in the oligomer, is preferably 1 to 15 per molecule, more preferably 2 to 6, even more preferably 2 to 4, and 2 is particularly preferable. Further, the weight average molecular weight of the oligomer is preferably 400 to 10,000, and more preferably 500 to 5,000.

Examples of the oligomer having a (meth) acryloyl group which can be used as another polymerizable monomer include urethane (meth)acrylate oligomers such as aliphatic urethane (meth)acrylate oligomer and aromatic urethane (meth)acrylate oligomer, acrylate (meth)acrylate oligomer, polyester (meth)acrylate oligomer, and epoxy (meth)acrylate oligomer.

<Photopolymerization Initiator>

The lower layer ink contains the acylphosphine oxide photopolymerization initiator, the benzophenone photopolymerization initiator, and 2-hydroxy-1-{1-[4-(2-hydroxy-2-methylpropionyl) phenyl]-1,3,3-trimethylindane-5-yl}-2-methylpropane-1-one as the photopolymerization initiator. Further, the upper layer ink contains the acylphosphine oxide photopolymerization initiator and the benzophenone photopolymerization initiator as the photopolymerization initiator.

Acylphosphine oxide photopolymerization initiators are commercially available, and for example, "Omnirad TPO", "Omnirad 403", "Omnirad 819", "Omnirad TPO-L", "OMNIPOL TP" and the like manufactured by IGMM RESINS B.V. may be provided. Further, the acylphosphine oxide photopolymerization initiators disclosed in, for example, WO 2017/086224 and WO 2020/049378 can be used.

Among the aforementioned photopolymerization initiators, from the viewpoints of the improvement of the curability, the prevention of curing wrinkles, and, the improvement of the whiteness when used in a white ink, the acylphosphine oxide photopolymerization initiator preferably contains at least bis(2,4,6-trimethylbenzoyl)-phenylphosphine oxide. Note that, an example of the commercial product of the aforementioned bis(2,4,6-trimethylbenzoyl)-phenylphosphine oxide includes "Omnirad 819".

Further, benzophenone photopolymerization initiators are commercially available, and for example, "Omnirad BP", "Omnirad BMS", "Ominirad 4PBZ", "OMNIRAD EMK", and "Esacure 1001M" manufactured by IGM RESINS B.V., and "GENOPOL BP-1", "GENOPOL BP-2" and the like manufactured by Rahn AG may be provided.

Further, 2-hydroxy-1-{1-[4-(2-hydroxy-2-methylpropionyl) phenyl]-1,3,3-trimethylindane-5-yl}-2-methylpropane-1-one which can be used in the lower layer ink is commercially available and for example, "SpeedCure XFs01" manufactured by LAMBSON LIMITED may be provided. Note that, 2-hydroxy-1-{3-[4-(2-hydroxy-2-methylpropionyl) phenyl]-1,1,3-trimethylindane-5-yl}-2-methylpropane-1-one which is the structural isomer may be used in the embodiment of the present invention in place of 2-hydroxy-1-{1-[4-(2-hydroxy-2-methylpropionyl) phenyl]-1,3,3-trimethylindane-5-yl}-2-methylpropane-1-one.

Regardless of whether the ink is a lower layer ink or an upper layer ink, and regardless of whether the ink is a white ink or a black ink, the content of the acylphosphine oxide photopolymerization initiator contained in the ink constituting the ink set is preferably 1 to 15% by mass based on the entire amount of the ink. If the aforementioned blending amount is satisfied, as stated above, in addition to improving the curability and the adhesion to the recording medium, it is possible to suppress curing wrinkles and improve the adhesion between the ink layers when the benzophenone photopolymerization initiator, and, the compound represented by General formula (A) are used in combination. Furthermore, by formulating with a content of 15% by mass or less, the solubility of the acylphosphine oxide photopolymerization initiator becomes sufficient, thus, the precipitation of the initiator in the ink can be suppressed.

Note that, from the viewpoint that the above-mentioned effects are more preferably brought about, the content of the acylphosphine oxide photopolymerization initiator is even more preferably 2 to 10% by mass when the ink is a white ink. On the other hand, when the ink is a black ink, the content of the acylphosphine oxide photopolymerization initiator is even more preferably 1.5 to 10% by mass, and particularly preferably 2 to 6% by mass.

Further, regardless of whether the ink is a lower layer ink or an upper layer ink, and regardless of whether the ink is a white ink or a black ink, the content of the benzophenone photopolymerization initiator contained in the ink constituting the ink set is preferably 2 to 10% by mass based on the entire amount of the ink. If the aforementioned blending amount is satisfied, as stated above, it is possible to suppress curing wrinkles and improve the adhesion between the ink layers when the acylphosphine oxide photopolymerization initiator, and, the compound represented by General formula (A) are used in combination.

Note that, from the viewpoint that the above-mentioned effects are more preferably brought about, when the ink is a white ink, the content of the benzophenone photopolymerization initiator relative to the content of the acylphosphine oxide photopolymerization initiator is preferably 25 to 125% by mass, and more preferably 50 to 100% by mass. Further, when the ink is a black ink, the content of the benzophenone photopolymerization initiator relative to the content of the acylphosphine oxide photopolymerization initiator is preferably 75 to 200% by mass, and more preferably 100 to 150% by mass.

Further, regardless of whether the ink is a white ink or a black ink, the content of the 2-hydroxy-1-{1-[4-(2-hydroxy-2-methylpropionyl) phenyl]-1,3,3-trimethylindane-5-yl}-2-methylpropane-1-one contained in the lower layer ink constituting the ink set is preferably 2 to 8% by mass based on the entire amount of the ink. If the aforementioned blending amount is satisfied, as stated above, the curability of the lower layer ink improves, and the adhesion between the ink layers further improves.

Further, as stated above, it is thought that the radical generated from the acylphosphine oxide photopolymerization initiator (DB-1) is involved in the cleavage of 2-hydroxy-1-{1-[4-(2-hydroxy-2-methylpropionyl) phenyl]-1,3,3-trimethylindane-5-yl}-2-methylpropane-1-one(DB-3) and the generation of the radical, thus, in order to more preferably bring about the aforementioned effect, it is preferable to stipulate the blending ratio of both compounds. Specifically, regardless of whether the ink is a white ink or a black ink, the content of the 2-hydroxy-1-{1-[4-(2-hydroxy-2-methylpropionyl) phenyl]-1,3,3-trimethylindane-5-yl}-2-methylpropane-1-one relative to the content of the acylphosphine oxide photopolymerization initiator is preferably 50 to 300% by mass. Further, 100 to 200% by mass is particularly preferable, and if within this range, it is possible to further suppress curling over time.

Furthermore, from the viewpoint that all of the effects stated above can be simultaneously and preferably brought about, regardless of whether the ink is a white ink or a black ink, the content of the acylphosphine oxide photopolymerization initiator relative to the total amount of the content of the acylphosphine oxide photopolymerization initiator, the benzophenone photopolymerization initiator, and, 2-hydroxy-1-{1-[4-(2-hydroxy-2-methylpropionyl) phenyl]-1,3,3-trimethylindane-5-yl}-2-methylpropane-1-one in the lower layer ink constituting the ink set is preferably 20 to 70% by mass, and more preferably 25 to 55% by mass. Further, regardless of whether the ink is a white ink or a black ink, the content of the acylphosphine oxide photopolymerization initiator relative to the total amount of the content of the acylphosphine oxide photopolymerization initiator, and, the benzophenone photopolymerization initiator in upper layer ink constituting the ink set is preferably 25 to 60% by mass, and more preferably 35 to 50% by mass.

Regardless of whether the ink is a lower layer ink or an upper layer ink, and, regardless of whether the ink is a white ink or a black ink, the ink constituting the ink set can arbitrarily use a photopolymerization initiator (hereinafter, referred to as the "other photopolymerization initiator") other than the aforementioned photopolymerization initiator in accordance with the type of light source and the irradiation intensity to be used. Examples of the other photopolymerization initiator include a thioxanthone-based photopolymerization initiator, a hydroxyacetophenone-based photopolymerization initiator, an alkylaminoacetophenone-based photopolymerization initiator, an oxime ester-based photopolymerization initiator and the like.

Note that, in the present description, materials which promote the generation of radicals of other photopolymerization initiators which are generally referred to as sensitizers are included in the "polymerization initiator". Examples of this type of material include aminobenzoate-based compounds and anthracene-based compounds.

Thioxanthone-based photopolymerization initiators are commercially available, and for example, "Omnirad ITX", "Omnirad DETX" and the like manufactured by IGM RESINS B.V. may be provided.

Hydroxyacetophenone-based initiators are commercially available, and for example, "Omnirad 127", "Omnirad 184", "Ominirad 1173", "Omnirad 2959", "Esacure KIP150" and the like manufactured by IGM RESINS B.V. may be provided.

Alkylaminoacetophenone-based initiators are commercially available, and for example, "Omnirad 907", "Omnirad 369", "Omnirad 379" and the like manufactured by IGM RESINS B.V. may be provided.

Oxime ester-based initiators are commercially available, and for example, "IRGACURE OXE01", "IRGACURE OXE02", "IRGACURE OXE04" and the like manufactured by BASF Corporation may be provided.

Aminobenzoate-based compounds are commercially available, and for example, "Esacure A198", "Omnipol ASA" "Omnirad EDB", and "Omnirad EHA" manufactured by IGM RESINS B.V., and "GENOPOL AB-1" "GENOPOL AB-2" and the like manufactured by Rahn AG may be provided.

Anthracene-based compounds are commercially available, and for example, "ANTHRACURE UVS-581" and the like manufactured by Kawasaki Kasei Chemicals Ltd. may be provided.

In addition to the aforementioned exemplified initiators, examples of the other photopolymerization initiator include "Omnirad 651", "Omnirad MBF" and the like manufactured by IGM RESINS B.V.

The upper layer ink constituting the ink set preferably further contains the photopolymerization initiator comprising an amino group as the photopolymerization initiator. By the upper layer ink including a photopolymerization initiator comprising an amino acid in addition to the acylphosphine oxide photopolymerization initiator (UB-1), and, the benzophenone photopolymerization initiator (UB-2) as the photopolymerization initiator, not only is the reduction of the surface curability due to oxygen inhibition prevented, but the generation of differences in the degree of curing of the ink between the lower layer ink layer and the upper layer ink layer is suppressed, and it becomes difficult to generate curing wrinkles. The reason therefor is undetermined, but it is thought that this is not because the photopolymerization initiator comprising an amino group can eliminate the influence of the curing inhibition on the upper layer ink due to the oxygen which is adhered to the surface of the lower layer ink layer when the upper layer ink discharged on the lower layer ink layer after the temporary curing is subjected to final curing.

Note that, the aforementioned exemplified alkylaminoacetophenone-based initiator, and, aminobenzoate-based compound may be provided as the photopolymerization initiator having an amino group.

On the one hand, as stated above, the lower layer ink constituting the ink set includes the acylphosphine oxide photopolymerization initiator, the benzophenone photopolymerization initiator, and 2-hydroxy-1-{1-[4-(2-hydroxy-2-methylpropionyl) phenyl]-1,3,3-trimethylindane-5-yl}-2-methylpropane-1-one as the photopolymerization initiator as indispensable components. Photopolymerization initiators other than these can be arbitrarily included, but from the viewpoint of the interlayer adhesion between the lower layer ink and the upper layer ink, and, from the viewpoint of the whiteness of the white ink when the lower layer ink is a white ink, it is preferable that the lower layer ink is substantially free of the thioxanthone-based photopolymerization initiator, and, the photopolymerization initiator having an amino acid.

When the lower layer ink is substantially free of the thioxanthone-based photopolymerization initiator, and, the photopolymerization initiator having an amino acid, it is also possible to prevent the polymerization reaction from proceeding faster than necessary during temporary curing, and it is also possible to prevent the risk that the adhesion to the upper layer ink decreases. Further, the thioxanthone-based photopolymerization initiator, and, the photopolymerization initiator having an amino acid both have an absorption wavelength in the vicinity of visible light, thus, the ink layer tends to be yellowish. Therefore, by controlling the blending amount of these photopolymerization initiators, when the lower layer ink is a white ink, the deterioration of the whiteness can be prevented.

Note that, the expression "substantially free" in the description means that there is no intentional addition of a certain amount with regards to the target compound, but does not eliminate changes over time, and, unintentional contamination such as impurities. More specifically, when "substantially free" of the target compound, the content thereof is preferably 2% by mass or less based on the entire amount of the ink, more preferably 1% by mass or less, even more preferably 0.5% by mass or less, and particularly preferably 0.2% by mass or less.

<Colorant>

The ink constituting the ink set includes a colorant. Conventionally known dyes and pigments can be used as the colorant, but in the embodiment of the present invention, from the viewpoints of the concentration of the printed matter, and, improving the storage stability and the discharge stability of the ink, the use of a pigment is preferable.

Examples of the pigment contained in the white ink constituting the ink set include inorganic pigments such as titanium oxide, zinc oxide, zirconium oxide, and barium sulphate, and, organic pigments such as hollow resin particles. Among these, specifically, titanium oxide is preferably used. From the viewpoints of the hiding power, the concentration and the suppression of curing wrinkles of the printed matter, and, the discharge stability from the inkjet head, the content of these pigments is preferably 10 to 70% by mass in the white ink, and even more preferably 20 to 60% by mass.

On the one hand, examples of the pigment contained in the black ink constituting the ink set include black inorganic pigments such as carbon black, carbon nanotube, and iron oxide, and, black organic pigments such as aniline black and azomethine black. Further, a pseudo black feeling may be created by the use of a blue pigment, a violet pigment, a red pigment, a green pigment, a brown pigment and the like together in place of using a black pigment (composite black). Among these, carbon black is preferably used in the black ink in the embodiment of the present invention. From the viewpoint of a jet-black feeling, the concentration, and the prevention of curing wrinkles of the printed matter, and, the discharge stability and the viscosity of the black ink, the content of these pigments is preferably 1 to 10% by mass in the black ink, and even more preferably 2 to 7% by mass.

<Pigment Dispersing Resin>

Regardless of whether the ink is a white ink or a black ink, when the ink constituting the ink set contains a pigment, a pigment dispersing resin can be used for the initial dispersibility and the storage stability of the pigment. The pigment dispersing resin can be a commercially available resin, and a pigment synthesized by a conventionally know method can also be used. Specific examples of the commercial product include "Ajisper-PB-821" and "Ajisper-PB-822" manufactured by Ajinomoto Fine-Techno Co., Inc., "BYKJET-9150", "BYKJET-9151", and "BYKJET-9152" manufactured by BYK Chemie Japan KK, "Solsperse 32000", "Solsperse 39000", "Solsperse J180" and "Solsperse J200" manufactured by Lubrizol Corporation and the like. Further, for example, a polymerizable monomer containing an acid group such as acrylic acid and methacrylic acid, a polymerizable monomer containing an amino group such as acrylamide, dimethylaminoethyl methacrylate, and diethylaminoethyl methacrylate, and, a copolymer of other polymerizable monomers in accordance with need may be used as the pigment dispersing resin.

In the case of a black ink, the amount added of the pigment dispersing resin is preferably 20 to 120% by mass relative to the total amount of the pigment, and more preferably 30 to 80% by mass. In the case of a white ink, the amount added of the pigment dispersing resin is preferably 1 to 100% by mass relative to the total amount of the pigment, and more preferably 3 to 50% by mass. By use of the pigment dispersing resin within the aforementioned blending amount range, the pigment dispersion having an excellent initial dispersibility and storage stability of the pigment can be obtained.

<Surface Modifier>

Regardless of whether the ink is a lower layer ink or an upper layer ink, a surface modifier is preferably added to the ink constituting the ink set for the purpose of the improvement of the wet spreadability on the recording medium, the improvement of the adhesion, and, the prevention of cissing. Examples of the surface modifier include silicone-based surface modifiers, fluorine-based surface modifiers, acrylic-based surface modifiers, acetylene glycol-based surface modifiers and the like. Among these, from the viewpoints of the surface tension reduction ability, and improvement of the adhesion, and, the compatibility with the polymerizable monomer, a silicone-based surface modifier and/or an acrylic-based surface modifier is preferably used.

Examples of silicone-based surface modifiers include compounds having a dimethylsiloxane structure, and/or, modified products thereof. Thereamong, polyether-modified siloxane surface modifier is particularly preferably used. Specific examples of the polyether include polyethylene oxide and polypropylene oxide. Further, only one polyether may be contained within the molecule, or both may be contained therein. Examples of the commercial products of the polyether-modified siloxane surface modifier preferably include BYK (a registered trademark)-378, 348, 349, BYK-UV3500, and UV3510 manufactured by BYK Chemie Japan KK, TEGO (a registered trademark) Glide 450, 440, 435, 432, 410, 406, 130, 110, and 100 manufactured by Evonik Industries and the like. Among these, from the viewpoints of the improvement of the adhesion and improvement of the image quality of the printed matter, BYK-378, 348, and UV3510; TEGO Glide 450, 440, 432, and 410 and the like can be particularly preferably used.

When using a silicone-based surface modifier, the content is preferably 0.1 to 5.0% by mass in the ink. By setting the content to 0.1% by mass or more, the wet spreadability on the recording medium can easily improve, and the adhesion also improves. On the one hand, by setting the content to 5.0% by mass or less, it is easy to maintain the storage stability and the discharge stability of the ink.

Further, for the same reasons as the case of the silicone-based surface modifier, an acrylic resin having a dimethylsiloxane structure is preferably used as an acrylic-based surface modifier.

An acrylic resin having a dimethylsiloxane structure may be a commercial product and a synthetic resin may also be used. Examples of the commercial product preferably include KP541, KP543, and KP545 manufactured by Shin-Etsu Chemical Co., Ltd., BYK-3550, BYK-3565, BYK-3566, and BYK-SILCLEAN 3700 manufactured by manufactured by BYK Chemie Japan KK, and LHP-810 and the like manufactured by Kusumoto Chemicals, Ltd.

When using an acrylic resin having a dimethylsiloxane structure, the content is preferably 0.01 to 2.0% by mass in the ink, more preferably 0.05 to 1.0% by mass, and particularly preferably 0.1 to 0.8% by mass. If the content is 0.01% by mass or more, the function as a surfactant can be sufficiently expressed, and if 2% by mass or less, it is possible to suitably maintain the storage stability and the discharge stability of the ink as is.

<Polymerization Inhibitor>

It is possible to use a polymerization inhibitor in the ink constituting the ink set to increase the storage stability over time and suppress curling wrinkles and the curling over time of a printed matter, regardless of whether the ink is a lower layer ink or an upper layer ink. Hindered phenol-based compounds, phenol-based compounds, hydroquinone-based compounds, phenothiazine-based compounds, phosphorus-based compounds, and, nitrosophenylhydroxylamine-based compounds are preferably used as the polymerization inhibitor. Specific examples include 4-methoxyphenol, t-butylhydroquinone, 2,6-di-t-butyl-4-methylphenol, pentaerythritol tetrakis [3-(3,5-di-t-butyl-4-hydroxyphenyl) propionate], hydroquinone, methylhydroquinone, phenothiazine, dicumylphenothiazine, triphenylphosphine, aluminum salt of N-nitrosophenylhydroxylamine and the like. From the viewpoints of maintaining the curability, while increasing the storage stability, and, suppressing curling wrinkles and the curling over time of a printed matter, the content of the polymerization inhibitor is preferably 0.01 to 2% by mass relative to the total amount of ink, and more preferably 0.1 to 1% by mass.

<Organic Solvent and Water>

Regardless of whether the ink is a lower layer ink or an upper layer ink, and regardless of whether the ink is a white ink or a black ink, an organic solvent and/or water may be used in the ink of the embodiment of the present invention in order to improve the reduction of the ink viscosity, and the wet spreadability on and the adhesion to the recording medium. When the ink contains an organic solvent and/or water, the content is preferably 0.01 to 30% by mass relative to the entire amount of the ink, more preferably 0.05 to 20% by mass, and even more preferably 0.1 to 10% by mass. Further, from the points of dryness, and, the wet spreadability on and the adhesion to the recording medium when an organic solvent is used, it is preferable to use a solvent having a boiling point of 140 to 300° C.

Examples of the organic solvent include alkylene glycol monoalkyl ether acetates, alkylene glycol diacetates, alkylene glycol monoalkyl ethers, alkylene glycol dialkyl ethers, alkanediols, lactams, lactones, other nitrogen-containing solvents, and other oxygen-containing solvents.

Thereamong, the organic solvent preferably contains at least one type selected from the group consisting of an alkylene glycol monoalkyl ether, an alkylene glycol dialkyl ether, and, an alkylene glycol monoalkyl ether acetate. Specifically, tripropylene glycol monomethyl ether, dipropylene glycol monomethyl ether, propylene glycol monomethyl ether, ethylene glycol monobutyl ether, diethylene glycol monobutyl ether, triethylene glycol monobutyl ether, tetraethylene dialkyl ether, ethylene glycol monobutyl ether acetate, and diethylene glycol diethyl ether are preferable, and at least one type selected from tetraethylene dialkyl ether, ethylene glycol monobutyl ether acetate, and, diethylene glycol diethyl ether is preferably included.
(Production Method of Ink)

The ink constituting the ink set can be produced by a conventionally known method. For example, the ink can be produced as follows, but the production method of the ink is not limited to the following. First, a pigment as the colorant and a polymerizable monomer are mixed with a pigment dispersing resin, a surface modifier, a polymerization inhibitor, an organic solvent and/or water and the like in accordance with need, and then dispersed by a paint shaker, a sand mill, a roll mill, or a media-less dispersion device or the like to prepare a pigment dispersion.

Subsequently, after the remainder of the polymerizable monomer, a photopolymerization initiator, and, a surface modifier, a polymerization inhibitor, an organic solvent and/or water and the like in accordance with need were added to the obtained pigment dispersion to achieve the desired ink characteristics and mixed well, the mixture was filtered through a filter and the like to filter out the coarse particles, and prepare the ink.
[Production Method of a Printed Matter]

Another embodiment of the present invention relates to a production method of a printed matter which uses the aforementioned ink. Specifically, a printed matter can be produced by having Step 1 for discharging and imparting a lower layer ink on a substrate, Step 2 for irradiating an ultraviolet ray from an ultraviolet light emitting diode to the substrate imparted with the lower layer ink obtained in Step 1, Step 3 for discharging and imparting an upper layer ink to the substrate imparted with the lower layer ink obtained in Step 2 in order to at least partially overlap with the lower layer ink, and Step 4 for irradiating ultraviolet rays from an ultraviolet lamp to the substrate imparted with the lower layer ink and the upper layer ink obtained in Step 3.
[Recording Medium (Substrate)]

A resin film substrate or a paper substrate is preferably used as the recording medium (substrate). A resin film substrate having a thickness of 10 to 90 μm, and, including materials selected from the group consisting of polypropylene, polyethylene, polyethylene terephthalate, and, nylon is preferable. Coated paper, art paper, laminated paper and the like are preferable as the paper substrate. The ink in the embodiment of the present invention is suitably used for the printing of packages formed by the aforementioned exemplified recording medium.

Note that, the aforementioned "resin film substrate including the material selected from the group consisting of polypropylene, polyethylene, polyethylene terephthalate, and, nylon" has a multi-layer structure, and, includes the resin film substrate (laminated film substrate) having at least one layer consisting of a material selected from the group consisting of the aforementioned polypropylene, polyethylene, polyethylene terephthalate, and nylon. Further, for the purpose of the improvement of the package strength, oxygen blocking and the like, there may be a layer consisting of AL (aluminum foil), VM film (aluminum deposited film and transparent vapor deposition film) and the like in the layer constituting the aforementioned laminated film.
<Ultraviolet Ray Irradiation Means>
(Ultraviolet Light Emitting Diode)

The ultraviolet ray irradiation means used in Step 2 includes an ultraviolet light emitting diode (UV-LED). Generally, a UV-LED has characteristics such as the ultraviolet light wavelength region to be irradiated is narrow and miniaturization is easy. Therefore, the irradiation wavelength and method of use of the UV-LED can be arbitrarily adjusted to some extent in accordance with the characteristics of the photopolymerization initiator and the colorant contained in the lower layer ink. In Step 2, among the plurality of photopolymerization initiators contained in the lower layer ink, from the viewpoint of mainly generating the cleavage of the acylphosphine oxide photopolymerization initiator to obtain the effect of the aforementioned embodiment of the present invention, the peak wavelength of the UV-LED to be used is preferably 280 to 420 nm, and particularly preferably 320 to 400 nm.

Further, due to its small size, a plurality of the UV-LEDs can be arranged in parallel. Therefore, a plurality of LEDs can be arranged in parallel and used to increase the irradiation intensity to the recording medium. In Step 2, the maximum illuminance of the ultraviolet light on the recording medium is preferably 2 to 20 $mW/cm^2$, and more preferably 5 to 15 $mW/cm^2$. Note that, a plurality of UV-LEDs having different peak wavelength may be used in parallel.

Note that, in Step 2, an ultraviolet ray irradiation means other than the UV-LED such as the ultraviolet lamp which will be described later may be used together with the UV-LED. However, ultraviolet lamps generally have a wide range of ultraviolet ray wavelengths which are irradiated, and may possibly exhibit unintended polymerization reaction behavior, thus, in Step 2 of the production method of the printed matter, it is preferable not to use an ultraviolet ray irradiation means other than the UV-LED.
(Ultraviolet Lamp)

On the one hand, the ultraviolet ray irradiation means used in Step 4 includes an ultraviolet lamp. Examples of the ultraviolet lamp include high-pressure mercury lamps, ultra-high-pressure mercury lamps, metal halide lamps, excimer laser lamps, xenon lamps and the like, and one type selected from among these may be used, or two or more types may be used together. Further, an ultraviolet lamp can also be used in combination with the aforementioned UV-LED.

Among the aforementioned exemplified ultraviolet lamps, from the viewpoint that ultraviolet light can be efficiently emitted in the UV-A region and the irradiated light can sufficiently reach the inside of the ink coating, a metal halide lamp is preferably used. Further, in Step 4, the maximum illuminance of the ultraviolet light on the recording medium is preferably 80 $mW/cm^2$ or more, and more preferably 120 $mW/cm^2$ or more.
<Ink Discharge Means>

The ink of the embodiment of the present invention set is used in an inkjet. Therefore, the inkjet head is used as both a discharge means of the lower layer ink in Step 1, and, a discharge means of the upper layer ink in Step 3.

The drop volume of the ink discharged from the inkjet head is preferably from 2 pl to 50 pl, and even more preferably from 3 pl to 20 pl. Further, the design resolution of the inkjet head is preferably 600 dpi or more. Specifically, any of KJ4A-AA, KJ4A-TA, and KJ4A-RH manufactured by KYOCERA Corporation, Samba G3L manufactured by FUJIFILM Holdings Corporation, S3200, S1600, S800, I3200, and 11600 manufactured by Seiko Epson Corporation, KM1024i and KM1024 manufactured by KONICA MINOLTA, INC., and MH5320, MH5340, MH5240, and MH5440 manufactured by Ricoh Company, Ltd. and the like can be preferably used as an inkjet head which satisfies the aforementioned condition.

Further, the ink can be discharged while being heated by a heating device such as a heater provided in the inkjet head so that the ink constituting the ink set has a suitable viscosity. From the viewpoint of continuously and stably discharging the ink, heating so that the viscosity of the ink at the time of discharge is 20 mPa·s or less is preferable, and heating so that the viscosity is 15 mPa·s or less is even more preferable.

The aforementioned Step 1 to Step 4 can be carried out continuously inline using a line printer and the like. From the viewpoint of obtaining a printing layer having productivity and good quality, the printing speed in this case is preferably 20 to 150 m/minute, and even more preferably 30 to 100 m/minute.

The present invention is related to the subject matter disclosed in prior Japanese Application No. 2020-216784 filed on Dec. 25, 2020, the entire contents of which are incorporated by reference herein.

EXAMPLES

The present invention will be described in further detail below. The following examples do not limit the scope of rights of the present invention in any way. Further, unless otherwise stated, the term "parts" indicates parts by mass and "%" indicates % by mass.

(Preparation Example of White Ink W1)

A white pigment dispersion was prepared prior to the white ink preparation. 50 parts of titanium oxide ("Tipaque PF740" manufactured by Ishihara Sangyo Kaisha, Ltd.) as the pigment, 3.75 parts of a pigment dispersant ("Solsperse 32000" manufactured by Lubrizol Corporation), and, 21.25 parts of 2-(2-vinyloxyethoxy)ethyl acrylate ("VEEA" manufactured by NIPPON SHOKUBAI CO., LTD.) as the polymerizable monomer (dispersion medium), and 25 parts of dipropylene glycol diacrylate ("DPGDA" (product name: M222) manufactured by Miwon Specialty Chemical Co., Ltd) were charged in a tank, and stirred with a high speed mixer until uniform, and then, a white pigment dispersion WB1 was obtained by dispersing with a horizontal sand mill for approximate 5 hours.

Subsequently, a polymerizable monomer, a photopolymerization initiator, the surface modifier, and a polymerization inhibitor were added sequentially while stirring in the white pigment dispersion WB1 obtained as stated above so as to form the blending formulation described in the row "W1" of Table 3 which will be described later, and mixed until the photopolymerization initiator dissolved. Moreover, filtration was performed using a depth type filter having a 0.5 μm pore size, and the white ink W1 was obtained by removing the coarse particles. Note that, the addition of each material may be performed in any sequence.

(Preparation Example of Black Ink K1)

Subsequently, a black pigment dispersion was prepared prior to the black ink preparation. 20 parts of carbon black ("Special Black 350" manufactured by Orion Engineered Carbons) as the pigment, 8 parts of pigment dispersant ("Solsperse 32000" manufactured by Lubrizol Corporation), and, 32 parts of 2-(2-vinyloxyethoxy)ethyl acrylate ("VEEA" manufactured by NIPPON SHOKUBAI CO., LTD.) as the polymerizable monomer (dispersion medium), 40 parts of dipropylene glycol diacrylate ("DPGDA" (product name: M222) manufactured by Miwon Specialty Chemical Co., Ltd) were charged in a tank, and stirred with a high speed mixer until uniform, and then, a black pigment dispersion BB1 was obtained by dispersing with a horizontal sand mill for approximate 5 hours.

Subsequently, a polymerizable monomer, a photopolymerization initiator, a surface modifier, and a polymerization inhibitor were added while stirring to the black pigment dispersion BB1 obtained as stated above so as to form the blending formulation described in the example of "K1" in Table 4 which will be described later, and mixed until the photopolymerization initiator dissolved. Moreover, filtration was performed using a depth type filter having a 0.5 μm pore size and the black ink K1 was obtained by removing the coarse particles.

<Production of Printed Matter>

The obtained white ink W1 was combined with the black ink K1 to make an ink set. Further, the white ink W1 was made as the lower layer ink and the black ink K1 was made as the upper layer ink, and the printed matter was produced by the following method, and the evaluations which will be described later were performed.

Two inkjet heads (KJ4A-AA) manufactured by KYOCERA Corporation were mounted, an ultraviolet light emitting diode ("G5A" manufactured by KYOCERA Corporation, emission wavelength 395 nm and set to 80% output) for temporary curing the lower layer ink was provided between the two inkjet heads, and furthermore, the printed matter was produced using an inkjet discharge apparatus ("OnePass JET" manufactured by Tritek Co., Ltd.) in which an ultraviolet lamp (240 W/cm metal halide lamp manufactured by GEW, Ltd., set to 80% output) was disposed further on the downstream side than the inkjet head (inkjet head arranged on the downstream side with respect to the transport direction of the recording medium) for discharging the upper layer ink, and passing through all of the aforementioned Steps 1 to 4.

Note that, a PET substrate ("PET50(K2411)" manufactured by Lintec Corporation) was used as the recording medium, and the printing was performed for each of the lower layer ink and the upper layer ink at a droplet volume of 14 pl and a print rate of 100%. Further, by printing so that the area of the ink layer having a print rate of 100% with the upper layer ink is smaller than the area of the ink layer having a print rate of 100% with the lower layer ink, there is a portion where only the lower layer ink was printed and a portion in which the ink layer made of the upper layer ink was laminated on the ink layer made of the lower layer ink in one printed matter.

Example 1

The following evaluations were performed with regards to the printed matter produced by the aforementioned method. The evaluation results are as illustrated in Table 5.

<Evaluation of Adhesion between Lower Layer Ink Layer and Recording Medium>

Among the produced printed matters, the portion where only the lower layer ink was printed was used and the adhesion between the ink layer made by the lower layer ink and the recording medium was evaluated in accordance with JIS K 5600-5-6 (Cross cut method). Moreover, the evaluations were based on the following scale of 1 to 5, and grades of 3 or more were deemed to be in the practicable region.

5: no peeling was observed
4: no squares were completely peeled, but there was partial peeling only at the cut end
3: less than 10% of the squares were completed peeled
2: 10% to less than 50% of the squares were completed peeled
1: 50% or more of the squares were completed peeled <Evaluation of Adhesion between Lower Layer Ink Layer and Upper Layer Ink Layer>

Among the produced printed matters, the portion in which the ink layer made of the upper layer ink was laminated on the ink layer made of the lower layer ink was used to evaluate the adhesion between the ink layer made by the lower layer ink and the ink layer made by the upper layer ink in accordance with JIS K 5600-5-6 (Cross cut method). Moreover, the evaluations were based on the following scale of 1 to 5, and grades of 3 or more were deemed to be in the practicable region.

5: no peeling was observed
4: no squares were completely peeled, but there was partial peeling only at the cut end
3: less than 10% of the squares were completed peeled
2: 10% to less than 50% of the squares were completed peeled
1: 50% or more of the squares were completed peeled <Whiteness Evaluation of White Ink>

Among the produced printed matters, "X-Rite eXact" manufactured by X-Rite, Inc. was used and the measurements for the portion where only white ink was printed were performed under the conditions of a viewing angle of 2°, a D50 light source, and a CIE color system. Moreover, based on the results of the measurements, the evaluations were based on the following scale of 1 to 5, and grades of 3 or more were deemed to be in the practicable region.

5: b value was less than 2.0
4: b value was 2.0 to less than 3.0
3: b value was 3.0 to less than 4.0
2: b value was 4.0 to less than 5.0
1: b value was 5.0 or more <Evaluation of Curing Wrinkles>

The evaluation of the curing wrinkles in the laminated portions of the lower layer ink and the upper layer ink was performed. Among the produced printed matters, a Microgloss manufactured by BYK Chemie Japan KK was used and the measurement of the glossiness was performed at a measurement angle of 60° for the portion in which the ink layer made of the upper layer ink was laminated on the ink layer made of the lower layer ink. Moreover, based on the results of the measurement, the evaluations were based on the following scale of 1 to 5, and grades of 3 or more were deemed to be in the practicable region.

5: gloss value was 75 or more
4: gloss value was 60 to less than 75
3: gloss value was 50 to less than 60
2: gloss value was 40 to less than 50
1: gloss value was less than 40

<Evaluation of Substrate Curling Over Time>

Among the produced printed matters, the portion in which the ink layer made of the upper layer ink was laminated on the ink layer made of the lower layer ink was cut into 10 cm$^2$ square shapes, and placed in an oven set to a temperature of 60° C. and a humidity of 20% RH for 14 days. Further, after being removed from the oven, the samples were left standing for one hour under an environment having a temperature of 25° C. and a humidity of 50% RH. Moreover, the curling over time of the printed matter was evaluated by placing the cut printed matter on a flat surface, and measuring the length floating from the flat surface for the respective four vertices, and then summing the floating lengths of the four vertices. Based on the results of this measurement, the evaluations were based on the following scale of 1 to 5, and grades of 3 or more were deemed to be in the practicable region.

5: sum of the floating lengths of the four vertices was less than 25 mm
4: sum of the floating lengths of the four vertices was from 25 mm to less than 40 mm
3: sum of the floating lengths of the four vertices was from 40 mm to less than 60 mm
2: sum of the floating lengths of the four vertices was from 60 mm to less than 80 mm
1: sum of the floating lengths of the four vertices was 80 mm or more, or the printed matter was deformed into a cylindrical shape and could not be measured <Preparation Examples of White Inks W2 to 23 and Black Inks K2 to 17>

Except for changing the type and the blending amount of the polymerizable monomer as shown in Table 1, the white pigment dispersions WB2 to WB7 were prepared in the same manner as the white pigment dispersion WB1. Further, except for changing the type and the blending amount of the polymerizable monomer as shown in Table 2, black pigment dispersions BB2 to BB7 were prepared in the same manner as the black pigment dispersion BB1.

TABLE 1

| White pigment dispersion | | | | WB1 | WB2 | WB3 | WB4 | WB5 | WB6 | WB7 |
|---|---|---|---|---|---|---|---|---|---|---|
| | Pigment | | PF740 | 50 | 50 | 50 | 50 | 50 | 50 | 50 |
| | Pigment disspersant | | Solsperse 32000 | 3.75 | 3.75 | 3.75 | 3.75 | 3.75 | 3.75 | 3.75 |
| Polymerizable monomer | Compound represented by General formula (A) | VEEA | 21.25 | | | | 21.25 | 31.25 | |
| | | PEG200DA | | 21.25 | | | | | |
| | | DEGDA | | | 21.25 | | | | |
| | Other polymerizable monomer | EGDA | | | | 21.25 | | | |
| | | PEA | | | | | | | 21.25 |
| | | HDDA | | | | | 25 | 15 | |
| | | DPGDA | 25 | 25 | 25 | 25 | | | 25 |

TABLE 2

| Black pigment dispersion | | | BB1 | BB2 | BB3 | BB4 | BB5 | BB6 | BB7 |
|---|---|---|---|---|---|---|---|---|---|
| | Pigment | Special Black350 | 20 | 20 | 20 | 20 | 20 | 20 | 20 |
| | Pigment disspersant | Solsperse 32000 | 8 | 8 | 8 | 8 | 8 | 8 | 8 |
| Polymerizable monomer | Compound represented by General formula (A) | VEEA | 32 | | | | | | |
| | | PEG200DA | | 32 | | | | | |
| | | DEGDA | | | | | 32 | | |
| | Other polymerizable monomer | EGDA | | | 32 | | | | |
| | | PEA | | | | | | 40 | |
| | | BzA | | | | | 32 | 32 | 32 |
| | | HDDA | | | | | 40 | | |
| | | DPGDA | 40 | 40 | 40 | 40 | | | 40 |

Moreover, the white ink and the black ink were prepared according to the respective blending formulations of Table 3 and Table 4.

TABLE 3

| | | | W1 | W2 | W3 | W4 | W5 | W6 |
|---|---|---|---|---|---|---|---|---|
| Pigment dispersion | White pigment dispersion | | WB1 | WB1 | WB2 | WB4 | WB1 | WB1 |
| | Blending amount | | 40 | 40 | 40 | 40 | 40 | 40 |
| Polymerizable monomer | Compound represented by General formula (A) | VEEA | 31.5 | 49.5 | | | 31.5 | 31.5 |
| | | PEG200DA | 13 | | 49.5 | | 13 | 9 |
| | | PEG400DA | | | | | | |
| | | DEGDA | | | | 49.5 | | |
| | Other polymerizable monomer | EGDA | | | | | | |
| | | PEA | | | | | | |
| | | BzA | | | | | | |
| | | HDDA | | | | | | |
| | | DPGDA | 5 | | | | 5 | 5 |
| | | TMP (EO)TA | | | | | | |
| | | DPHA | | | | | | |
| Photopolymerization initiator | Acylphosphine oxide-based | Omnirad TPO H | | | | | | |
| | | Omnirad 819 | 4 | 4 | 4 | 4 | 4 | 4 |
| | Benzophenone-based | Omnirad BMS | 2 | 2 | | | | 2 |
| | | GENOPOL BP-2 | | | 2 | 2 | 2 | |
| | tMeInd Thioxanthone-based | SpeedCure XFs01 | 4 | 4 | 4 | 4 | 4 | 8 |
| | | Omnirad ITX | | | | | | |
| | Amino group-containing photopolymerization initiator | Alkylaminoacetophenone-based | Omnirad 369 | | | | | | |
| | | Aminobenzoate-based | Omnirad EDB Esacure A198 | | | | | | |
| Surface modifier | | BYK UV3510 | 0.4 | 0.4 | 0.4 | 0.4 | 0.4 | 0.4 |
| Polymerization inhibitor | | BHT | 0.1 | 0.1 | 0.1 | 0.1 | 0.1 | 0.1 |
| Total amount | | | 100 | 100 | 100 | 100 | 100 | 100 |

| | | | W7 | W8 | W9 | W10 | W11 | W12 |
|---|---|---|---|---|---|---|---|---|
| Pigment dispersion | White pigment dispersion | | WB1 | WB1 | WB5 | WB6 | WB5 | WB6 |
| | Blending amount | | 40 | 40 | 40 | 40 | 40 | 40 |
| Polymerizable monomer | Compound represented by General formula (A) | VEEA | 31.5 | 31.5 | 1.5 | 47.5 | 41.5 | 42.5 |
| | | PEG200DA | | | 15 | | | |
| | | PEG400DA | 9 | | | | | |
| | | DEGDA | | | | | | |
| | Other polymerizable monomer | EGDA | | | | | | |
| | | PEA | | | 15 | | | |
| | | BzA | | | 15 | | | 2 |
| | | HDDA | | | 17 | | | |
| | | DPGDA | 5 | 5 | | | | |
| | | TMP (EO)TA | | | | | 8 | |
| | | DPHA | | | | | | 5 |
| Photopolymerization initiator | Acylphosphine oxide-based | Omnirad TPO H | | | | 2 | | 4 |
| | | Omnirad 819 | 4 | 4 | 4 | 2 | 4 | |
| | Benzophenone-based | Omnirad BMS | 2 | 2 | 3 | | 2 | 2 |
| | | GENOPOL BP-2 | | | | 4 | | |
| | tMeInd Thioxanthone-based | SpeedCure XFs01 | 8 | 2 | 4 | 4 | 4 | 4 |
| | | Omnirad ITX | | | | | | |
| | Amino group-containing photopolymerization initiator | Alkylaminoacetophenone-based | Omnirad 369 | | | | | | |
| | | Aminobenzoate-based | Omnirad EDB Esacure A198 | | | | | | |

TABLE 3-continued

| | | | | | | | | |
|---|---|---|---|---|---|---|---|---|
| Surface modifier | | BYK UV3510 | 0.4 | 0.4 | 0.4 | 0.4 | 0.4 | 0.4 |
| Polymerization inhibitor | | BHT | 0.1 | 0.1 | 0.1 | 0.1 | 0.1 | 0.1 |
| Total amount | | | 100 | 100 | 100 | 100 | 100 | 100 |

| | | | | W13 | W14 | W15 | W16 | W17 | W18 |
|---|---|---|---|---|---|---|---|---|---|
| Pigment dispersion | White pigment dispersion | | | WB1 | WB1 | WB1 | WB1 | WB1 | WB7 |
| | Blending amount | | | 40 | 40 | 40 | 40 | 40 | 40 |
| Polymerizable monomer | Compound represented by General formula (A) | | VEEA | 31.5 | 31.5 | 31.5 | 31.5 | 31.5 | |
| | | | PEG200DA | 6 | 6 | 6 | 6 | 8 | |
| | | | PEG400DA | | | | | | |
| | | | DEGDA | | | | | | |
| | Other polymerizable monomer | | EGDA | | | | | | |
| | | | PEA | | | | | | 4.5 |
| | | | BzA | | | | | | 40 |
| | | | HDDA | 5 | 5 | 5 | 5 | | |
| | | | DPGDA | 6 | 6 | 5 | 6 | 10 | 5 |
| | | | TMP (EO)TA | | | | | | |
| | | | DPHA | | | | | | |
| Photopolymerization initiator | Acylphosphine oxide-based | | Omnirad TPO H | 4 | 4 | 4 | 4 | | |
| | | | Omnirad 819 | | | | | 4 | 4 |
| | Benzophenone-based | | Omnirad BMS | 2 | 2 | 2 | 2 | 4 | 2 |
| | | | GENOPOL BP-2 | | | | | | |
| | tMeInd | | SpeedCure XFs01 | 5 | 4 | 4 | 4 | | 4 |
| | Thioxanthone-based | | Omnirad ITX | | 1 | | | | |
| | Amino group-containing photopolymerization initiator | Alkylaminoacetophenone-based | Omnirad 369 | | | | 1 | | |
| | | Aminobenzoate-based | Omnirad EDB | | | 2 | | | |
| | | | Esacure A198 | | | | | 2 | |
| Surface modifier | | | BYK UV3510 | 0.4 | 0.4 | 0.4 | 0.4 | 0.4 | 0.4 |
| Polymerization inhibitor | | | BHT | 0.1 | 0.1 | 0.1 | 0.1 | 0.1 | 0.1 |
| Total amount | | | | 100 | 100 | 100 | 100 | 100 | 100 |

| | | | | W19 | W20 | W21 | W22 | W23 |
|---|---|---|---|---|---|---|---|---|
| Pigment dispersion | White pigment dispersion | | | WB3 | WB1 | WB1 | WB1 | WB1 |
| | Blending amount | | | 40 | 40 | 40 | 40 | 40 |
| Polymerizable monomer | Compound represented by General formula (A) | | VEEA | | 31.5 | 31.5 | 31.5 | 31.5 |
| | | | PEG200DA | | 11 | 11 | 13 | 6 |
| | | | PEG400DA | | | | | |
| | | | DEGDA | | | | | |
| | Other polymerizable monomer | | EGDA | 49.5 | | | | |
| | | | PEA | | | | | |
| | | | BzA | | | | | |
| | | | HDDA | | | | | 5 |
| | | | DPGDA | | 5 | 5 | 5 | 6 |
| | | | TMP (EO)TA | | | | | |
| | | | DPHA | | | | | |
| Photopolymerization initiator | Acylphosphine oxide-based | | Omnirad TPO H | | | 8 | 4 | 4 |
| | | | Omnirad 819 | 4 | | | 4 | |
| | Benzophenone-based | | Omnirad BMS | 2 | 4 | | 2 | |
| | | | GENOPOL BP-2 | | | | | |
| | tMeInd | | SpeedCure XFs01 | 4 | 8 | 4 | | 3 |
| | Thioxanthone-based | | Omnirad ITX | | | | | |
| | Amino group-containing photopolymerization initiator | Alkylaminoacetophenone-based | Omnirad 369 | | | | | 4 |
| | | Aminobenzoate-based | Omnirad EDB | | | | | |
| | | | Esacure A198 | | | | | |
| Surface modifier | | | BYK UV3510 | 0.4 | 0.4 | 0.4 | 0.4 | 0.4 |
| Polymerization inhibitor | | | BHT | 0.1 | 0.1 | 0.1 | 0.1 | 0.1 |
| Total amount | | | | 100 | 100 | 100 | 100 | 100 |

TABLE 4

| | | | | K1 | K2 | K3 | K4 | K5 |
|---|---|---|---|---|---|---|---|---|
| Pigment dispersion | Black pigment dispersion | | | BB1 | BB1 | BB2 | BB4 | BB1 |
| | Blending amount | | | 12.5 | 12.5 | 12.5 | 12.5 | 12.5 |
| Polymerizable monomer | Compound represented by General formula (A) | | VEEA | 36 | 73 | | | 36 |
| | | | PEG200DA | | | 73 | | |
| | | | PEG400DA | | | | | |
| | | | DEGDA | | | | 73 | |

TABLE 4-continued

| | | | | | | | | |
|---|---|---|---|---|---|---|---|---|
| | Other polymerizable monomer | | EGDA | | | | | |
| | | | PEA | | | | | |
| | | | BzA | | | | | |
| | | | HDDA | | | | | |
| | | | DPGDA | | 41 | | | 41 |
| | | | TMP (EO)TA | | | | | |
| | | | DPHA | | | | | |
| Photopolymerization initiator | Acylphosphine oxide-based | | Omnirad TPO H | | | | | |
| | | | Omnirad 819 | 4 | 4 | 4 | 4 | 4 |
| | Benzophenone-based | | Omnirad BMS | 6 | 6 | | | |
| | | | GENOPOL BP-2 | | | 6 | 6 | 6 |
| | tMeInd | | SpeedCure XFs01 | | | | | |
| | Amino group-containing photopolymerization initiator | Alkylaminoacetophenone-based | Omnirad 369 | | | | | |
| | | Aminobenzoate-based | Omnirad EDB | | | | | |
| | | | Esacure A198 | | 4 | 4 | 4 | |
| | | | GENOPOL AB-2 | | | | | |
| Surface modifier | | | BYK UV3510 | 0.4 | 0.4 | 0.4 | 0.4 | 0.4 |
| Polymerization inhibitor | | | BHT | 0.1 | 0.1 | 0.1 | 0.1 | 0.1 |
| Total amount | | | | 100 | 100 | 100 | 100 | 100 |

| | | | | K6 | K7 | K8 | K9 |
|---|---|---|---|---|---|---|---|
| Pigment dispersion | Black pigment dispersion | | | BB1 | BB1 | BB1 | BB1 |
| | Blending amount | | | 12.5 | 12.5 | 12.5 | 12.5 |
| Polymerizable monomer | Compound represented by General formula (A) | | VEEA | 36 | 36 | 36 | 36 |
| | | | PEG200DA | | | | |
| | | | PEG400DA | | | 9 | |
| | | | DEGDA | | | | |
| | Other polymerizable monomer | | EGDA | | | | |
| | | | PEA | | | | |
| | | | BzA | | | | |
| | | | HDDA | | | | |
| | | | DPGDA | 39 | 28 | 37 | 37 |
| | | | TMP (EO)TA | | | | |
| | | | DPHA | | | | |
| Photopolymerization initiator | Acylphosphine oxide-based | | Omnirad TPO H | | | 6 | |
| | | | Omnirad 819 | 4 | 4 | | 4 |
| | Benzophenone-based | | Omnirad BMS | 6 | | 6 | 6 |
| | | | GENOPOL BP-2 | | 6 | | |
| | tMeInd | | SpeedCure XFs01 | | | | |
| | Amino group-containing photopolymerization initiator | Alkylaminoacetophenone-based | Omnirad 369 | | | 2 | |
| | | Aminobenzoate-based | Omnirad EDB | 2 | | | |
| | | | Esacure A198 | | 4 | | 4 |
| | | | GENOPOL AB-2 | | | | |
| Surface modifier | | | BYK UV3510 | 0.4 | 0.4 | 0.4 | 0.4 |
| Polymerization inhibitor | | | BHT | 0.1 | 0.1 | 0.1 | 0.1 |
| Total amount | | | | 100 | 100 | 100 | 100 |

| | | | | K10 | K11 | K12 | K13 | K14 | K15 | K16 | K17 |
|---|---|---|---|---|---|---|---|---|---|---|---|
| Pigment dispersion | Black pigment dispersion | | | BB1 | BB5 | BB6 | BB1 | BB3 | BB7 | BB1 | BB1 |
| | Blending amount | | | 12.5 | 12.5 | 12.5 | 12.5 | 12.5 | 12.5 | 12.5 | 12.5 |
| Polymerizable monomer | Compound represented by General formula (A) | | VEEA | 36 | 13 | 60 | 36 | | | 36 | 36 |
| | | | PEG200DA | | | | | | | | |
| | | | PEG400DA | | | | | | | | |
| | | | DEGDA | | | | 20 | | | | |
| | Other polymerizable monomer | | EGDA | | | | | 73 | | | |
| | | | PEA | | | 5 | | | | | |
| | | | BzA | | 16 | 6 | | | 36 | | |
| | | | HDDA | | 29 | | | | | | |
| | | | DPGDA | 37 | | | 11 | | 39 | 39 | 39 |
| | | | TMP (EO)TA | | 20 | | | | | | |
| | | | DPHA | | | 6 | | | | | |
| Photopolymerization initiator | Acylphosphine oxide-based | | Omnirad TPO H | | | | | 4 | | | 6 |
| | | | Omnirad 819 | 4 | 4 | 4 | 6 | 4 | 4 | | 4 |
| | Benzophenone-based | | Omnirad BMS | 6 | 5 | 6 | 6 | 6 | 6 | 6 | |
| | | | GENOPOL BP-2 | | | | | | | | |
| | tMeInd | | SpeedCure XFs01 | | | | | 4 | | 4 | |
| | Amino group-containing photopolymerization initiator | Alkylaminoacetophenone-based | Omnirad 369 | | | | | | | | |
| | | Aminobenzoate-based | Omnirad EDB | | | | | | 2 | 2 | 2 |
| | | | Esacure A198 | | | | | 4 | | | |
| | | | GENOPOL AB-2 | 4 | | | | | | | |

TABLE 4-continued

| | | | | | | | | | |
|---|---|---|---|---|---|---|---|---|---|
| Surface modifier | BYK UV3510 | 0.4 | 0.4 | 0.4 | 0.4 | 0.4 | 0.4 | 0.4 | 0.4 |
| Polymerization inhibitor | BHT | 0.1 | 0.1 | 0.1 | 0.1 | 0.1 | 0.1 | 0.1 | 0.1 |
| Total amount | | 100 | 100 | 100 | 100 | 100 | 100 | 100 | 100 |

Note that, "tMeInd" in Tables 3 and 4 means "2-hydroxy-1-{1-[4-(2-hydroxy-2-methylpropionyl) phenyl]-1,3,3-trimethylindane-5-yl}-2-methylpropane-1-one". Further, the details of the abbreviations of the materials described in Tables 1 to 4 are as illustrated below.

VEEA: 2-(2-vinyloxyethoxy)ethyl acrylate(manufactured by NIPPON SHOKUBAI CO., LTD.)

PEG200DA: polyethylene glycol 200 diacrylate($n \approx 4$ in General formula (A))

PEG400DA: polyethylene glycol 400 diacrylate($n \approx 9$ in General formula (A))

EGDA: ethylene glycol diacrylate

DEGDA: diethylene glycol diacrylate

PEA: 2-phenoxyethyl acrylate

BzA: benzyl acrylate

HDDA: 1,6-hexanediol diacrylate

DPGDA: dipropylene glycol diacrylate

TMP(EO)TA: trimethylolpropane EO-modified triacrylate

DPHA: dipentaerythritol hexaacrylate

Omnirad TPO H: 2,4,6-trimethylbenzoyl-diphenylphosohine oxide

Omnirad 819: bis(2,4,6-trimethylbenzoyl)-phenylphosphine oxide (manufactured by IGM RESINS B.V.)

Omnirad BMS: [4-(methylphenylthio)phenyl]-phenyl-methane (manufactured by IGM RESINS B.V.)

GENOPOL BP-2: benzophenone compound (manufactured by Rahn AG)

SpeedCure XFs01: 2-hydroxy-1-{1-[4-(2-hydroxy-2-methylpropionyl) phenyl]-1,3,3-trimethylindane-5-yl}-2-methylpropane-1-one (manufactured by LAMBSON LIMITED)

Omnirad ITX: 2-isopropylthioxanthone (manufactured by IGM RESINS B.V.)

Omnirad 369: 2-(dimethylamino)-1-(4-morpholinophenyl)-2-benzyl-1-butanone (manufactured by IGM RESINS B.V.)

Omnirad EDB: ethyl p-(dimethylamino) benzoate (manufactured by IGM RESINS B.V.)

Esacure A198: aminobenzoate-based compound (manufactured by IGM RESINS B.V.)

GENOPOL AB-2: aminobenzoate-based compound (manufactured by Rahn AG)

BYK UV3510: silicone-based surface tension modifier manufactured by BYK Chemie Japan KK BHT: 2,6-di-tert-butyl-4-methylphenol ("BHT SWANOX" manufactured by Seiko Chemical Co., Ltd.)

Examples 2 to 23 and Comparative Examples 1 to 10

The obtained white ink and black ink were combined as described in Table 5 to make an ink set. Moreover, the printed matters were produced by the aforementioned method and were evaluated. The evaluation results are as illustrated in Table 5. Note that, with respect to Comparative example 1 and Comparative examples 3 to 5, the adhesion between the lower layer ink and the substrate was remarkably weak, thus, the adhesion between the lower layer ink layer and the upper layer ink layer evaluation could not be carried out.

TABLE 5

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Lower layer ink | W1 | W2 | W3 | W4 | W5 | W1 | W1 | W1 | W1 | W1 |
| Upper layer ink | K1 | K2 | K3 | K4 | K5 | K2 | K3 | K4 | K6 | K7 |
| Adhesion between lower layer1 ink layer and substrate | 5 | 5 | 4 | 4 | 5 | 5 | 5 | 5 | 4 | 5 |
| Interlayer adhesion between lower layer ink layer and upper layer ink layer | 4 | 5 | 4 | 4 | 5 | 5 | 5 | 5 | 5 | 5 |
| Whiteness of white ink | 5 | 5 | 5 | 5 | 5 | 5 | 5 | 5 | 5 | 5 |
| Curing wrinkles in laminated portions of lower layer ink layer and upper layer ink layer | 4 | 5 | 5 | 5 | 4 | 4 | 4 | 5 | 5 | 5 |
| Substrate curl over time | 5 | 5 | 5 | 4 | 5 | 5 | 5 | 5 | 5 | 5 |

| | Example 11 | Example 12 | Example 13 | Example 14 | Example 15 | Example 16 | Example 17 | Example 18 |
|---|---|---|---|---|---|---|---|---|
| Lower layer ink | W1 | W6 | W7 | W8 | W9 | W10 | W11 | W12 |
| Upper layer ink | K8 | K6 | K7 | K8 | K11 | K9 | K10 | K12 |
| Adhesion between lower layer1 ink layer and substrate | 4 | 5 | 5 | 5 | 3 | 5 | 5 | 5 |
| Interlayer adhesion between lower layer ink layer and upper layer ink layer | 5 | 5 | 5 | 5 | 4 | 5 | 5 | 5 |
| Whiteness of white ink | 5 | 5 | 5 | 5 | 5 | 4 | 5 | 4 |
| Curing wrinkles in laminated portions of lower layer ink layer and upper layer ink layer | 4 | 5 | 5 | 4 | 3 | 5 | 5 | 5 |
| Substrate curl over time | 4 | 5 | 5 | 3 | 3 | 5 | 5 | 5 |

TABLE 5-continued

|  | Example 19 | Example 20 | Example 21 | Example 22 | Example 23 | Comparative example 1 | Comparative example 2 | Comparative example 3 |
|---|---|---|---|---|---|---|---|---|
| Lower level ink | W13 | W14 | W15 | W16 | K13 | W18 | W19 | W20 |
| Upper level ink | K9 | K9 | K9 | K9 | W17 | K1 | K14 | K1 |
| Adhesion between lower layer1 ink layer and substrate | 5 | 5 | 5 | 5 | 5 | 1 | 2 | 2 |
| Interlayer adhesion between lower layer ink layer and upper layer ink layer | 5 | 5 | 5 | 5 | 3 | X | 2 | X |
| Whiteness of white ink | 5 | 3 | 3 | 3 | 5 | 5 | 5 | 5 |
| Curing wrinkles in laminated portions of lower layer ink layer and upper layer ink layer | 5 | 5 | 5 | 5 | 5 | 3 | 3 | 1 |
| Substrate curl over time | 5 | 5 | 5 | 5 | 5 | 4 | 2 | 3 |

|  | Comparative example 4 | Comparative example 5 | Comparative example 6 | Comparative example 7 | Comparative example 8 | Comparative example 9 | Comparative example 10 |
|---|---|---|---|---|---|---|---|
| Lower level ink | W21 | W22 | W23 | W1 | W1 | W1 | W1 |
| Upper level ink | K1 | K1 | K9 | K14 | K15 | K16 | K17 |
| Adhesion between lower layer1 ink layer and substrate | 1 | 1 | 3 | 4 | 4 | 4 | 4 |
| Interlayer adhesion between lower layer ink layer and upper layer ink layer | X | X | 4 | 2 | 3 | 1 | 2 |
| Whiteness of white ink | 5 | 5 | 1 | 5 | 5 | 5 | 5 |
| Curing wrinkles in laminated portions of lower layer ink layer and upper layer ink layer | 1 | 1 | 2 | 3 | 2 | 1 | 2 |
| Substrate curl over time | 1 | 1 | 4 | 2 | 1 | 3 | 3 |

(X): Evaluation not possible

The results of the evaluation are as shown in Table 5, the combinations of the lower layer ink and the upper layer ink which satisfy the aforementioned conditions could obtain the printed matter having a good quality for all of the adhesion between the lower layer ink layer and the recording medium, the adhesion between the lower layer ink layer and the upper layer ink layer, the whiteness of the white ink, curing wrinkles, and the substrate curling over time.

For example, when compared with Examples 2, 3 and 4, it was verified that the adhesion between the lower layer ink layer and the recording medium, and, the adhesion between the lower layer ink layer and the upper layer ink layer improved by containing 2-(2-vinyloxyethoxy)ethyl acrylate as the compound represented by General formula (A).

Further, for example, when compared with Example 2 and Example 18, it was verified that the whiteness of the white ink improved by use of bis(2,4,6-trimethylbenzoyl)-phenylphosphine oxide as the acylphosphine oxide photopolymerization initiator contained in the white ink.

Furthermore, for example, when compared with Example 1 and Example 10, it was verified that the adhesion between the lower layer ink layer and the upper layer ink layer was maintained while the curing wrinkles in the laminated portion improved by the upper layer ink containing the aminobenzoate-based compound.

On the one hand, when the lower layer ink was free of the compound represented by General formula (A) as in Comparative example 1 and Comparative example 2, the adhesion between the lower layer ink layer and the recording medium, and between the lower layer ink layer and the upper layer ink layer was insufficient, and it became clear that the curling property decreases over time.

Further, in the case when the lower layer ink was free of the acylphosphine oxide photopolymerization initiator (Comparative example 3), and the case when the lower layer ink was free of the benzophenone photopolymerization initiator (Comparative example 4), not only the adhesion between the lower layer ink and the recording medium, but the curling wrinkles in the laminated portion and the curling over time deteriorate, and these qualities cannot be simultaneously satisfied. As can also be verified from the comparison with Example 1, it was verified that all of these problems can be solved by the lower layer ink containing all of the acylphosphine oxide photopolymerization initiator, the benzophenone photopolymerization initiator, and 2-hydroxy-1-{1-[4-(2-hydroxy-2-methylpropionyl) phenyl]-1,3,3-trimethylindane-5-yl}-2-methylpropane-1-one.

Further, in the case in which the lower layer ink was free of 2-hydroxy-1-{1-[4-(2-hydroxy-2-methylpropionyl) phenyl]-1,3,3-trimethylindane-5-yl}-2-methylpropane-1-one (Comparative example 5), with the exception of the whiteness of the white ink, none of the characteristics reached the practical level. In order to improve the adhesion between the lower layer ink and the recording medium, there is also a method for using an alkylaminoacetophenone-based photopolymerization initiator in the lower layer ink as in Comparative example 6, but in this case, the whiteness of the white ink and the curing wrinkles deteriorate, and accordingly, all of the problems cannot be solved simultaneously.

On the one hand, when the upper layer ink was free of the compound represented by General formula (A) (Comparative example 7 and Comparative example 8), it was obvious that one or more items among the adhesion between the lower layer ink layer and the upper layer ink layer, the curing wrinkles, and the substrate curling over time do not reach the practical level.

Further, as in Comparative example 9 and Comparative example 10, when the upper layer ink was free of the acylphosphine oxide photopolymerization initiator and the benzophenone polymerization initiator, it was verified that the adhesion between the lower layer ink layer and the upper layer ink layer, and, the curing wrinkles do not reach the practical level. From the above, in order to simultaneously solve all of the problems of the present invention, it is clear that it is necessary for the upper layer ink to contain the acylphosphine oxide photopolymerization initiator and the benzophenone photopolymerization initiator.

The invention claimed is:

1. An ultraviolet curable inkjet ink set comprising a lower layer ink and an upper layer ink, and used in a line pass inkjet printer having a temporary curing step, wherein
among the lower layer ink and the upper layer ink, one of the inks is a white ink, and the other ink is a black ink,
the lower layer ink contains a first polymerizable monomer, a first photopolymerization initiator, and a first colorant,
the first polymerizable monomer comprises a compound represented by the following General formula (A),
the first photopolymerization initiator contains a first acylphosphine oxide photopolymerization initiator, a first benzophenone photopolymerization initiator, and 2-hydroxy-1-{1-[4-(2-hydroxy-2-methylpropionyl)phenyl]-1,3,3-trimethylindane-5-yl}-2-methylpropane-1-one,
the upper layer ink contains a second polymerizable monomer, a second photopolymerization initiator, and a second colorant,
the second polymerizable monomer comprises a compound represented by the following General formula (A), and
the second photopolymerization initiator contains a second acylphosphine oxide photopolymerization initiator, and a second benzophenone photopolymerization initiator,

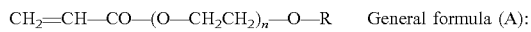

General formula (A): $CH_2=CH-CO-(O-CH_2CH_2)_n-O-R$ in General formula (A), R represents an acryloyl group or a vinyl group, and n represents an integer from 2 to 10, and
the compound represented by General formula (A) in the first polymerizable monomer and the compound represented by General formula (A) in the second polymerizable monomer may be the same or different.

2. The ultraviolet curable inkjet ink set according to claim 1, wherein R of the compound represented by General formula (A) in the first polymerizable monomer and R of the compound represented by General formula (A) in the second polymerizable monomer are both vinyl groups.

3. The ultraviolet curable inkjet ink set according to claim 1, wherein the upper layer ink further contains a photopolymerization initiator having an amino group.

4. The ultraviolet curable inkjet ink set according to claim 1, wherein the lower layer ink is substantially free of a thioxanthone-based photopolymerization initiator, and, a photopolymerization initiator having an amino group.

5. A production method of a printed matter which uses the ultraviolet curable inkjet ink set according to claim 1, comprising
Step 1 for discharging and imparting the lower layer ink on a substrate,
Step 2 for irradiating an ultraviolet ray from an ultraviolet light emitting diode to the substrate imparted with the lower layer ink obtained in Step 1,
Step 3 for discharging and imparting the upper layer ink to the substrate imparted with the lower layer ink obtained in Step 2 in order to at least partially overlap with the lower layer ink, and
Step 4 for irradiating an ultraviolet ray from an ultraviolet lamp to the substrate imparted with the lower layer ink and the upper layer ink obtained in Step 3.

6. The ultraviolet curable inkjet ink set according to claim 2, wherein the upper layer ink further contains a photopolymerization initiator having an amino group.

7. The ultraviolet curable inkjet ink set according to claim 2, wherein the lower layer ink is substantially free of a thioxanthone-based photopolymerization initiator, and, a photopolymerization initiator having an amino group.

8. A production method of a printed matter which uses the ultraviolet curable inkjet ink set according to claim 2, comprising
Step 1 for discharging and imparting the lower layer ink on a substrate,
Step 2 for irradiating an ultraviolet ray from an ultraviolet light emitting diode to the substrate imparted with the lower layer ink obtained in Step 1,
Step 3 for discharging and imparting the upper layer ink to the substrate imparted with the lower layer ink obtained in Step 2 in order to at least partially overlap with the lower layer ink, and
Step 4 for irradiating an ultraviolet ray from an ultraviolet lamp to the substrate imparted with the lower layer ink and the upper layer ink obtained in Step 3.

9. The ultraviolet curable inkjet ink set according to claim 3, wherein the lower layer ink is substantially free of a thioxanthone-based photopolymerization initiator, and, a photopolymerization initiator having an amino group.

10. A production method of a printed matter which uses the ultraviolet curable inkjet ink set according to claim 3, comprising
Step 1 for discharging and imparting the lower layer ink on a substrate,
Step 2 for irradiating an ultraviolet ray from an ultraviolet light emitting diode to the substrate imparted with the lower layer ink obtained in Step 1,
Step 3 for discharging and imparting the upper layer ink to the substrate imparted with the lower layer ink obtained in Step 2 in order to at least partially overlap with the lower layer ink, and
Step 4 for irradiating an ultraviolet ray from an ultraviolet lamp to the substrate imparted with the lower layer ink and the upper layer ink obtained in Step 3.

11. The ultraviolet curable inkjet ink set according to claim 6, wherein the lower layer ink is substantially free of a thioxanthone-based photopolymerization initiator, and, a photopolymerization initiator having an amino group.

12. A production method of a printed matter which uses the ultraviolet curable inkjet ink set according to claim 4, comprising
Step 1 for discharging and imparting the lower layer ink on a substrate,
Step 2 for irradiating an ultraviolet ray from an ultraviolet light emitting diode to the substrate imparted with the lower layer ink obtained in Step 1,
Step 3 for discharging and imparting the upper layer ink to the substrate imparted with the lower layer ink obtained in Step 2 in order to at least partially overlap with the lower layer ink, and
Step 4 for irradiating an ultraviolet ray from an ultraviolet lamp to the substrate imparted with the lower layer ink and the upper layer ink obtained in Step 3.

13. A production method of a printed matter which uses the ultraviolet curable inkjet ink set according to claim 6, comprising
Step 1 for discharging and imparting the lower layer ink on a substrate, Step 2 for irradiating an ultraviolet ray from an ultraviolet light emitting diode to the substrate imparted with the lower layer ink obtained in Step 1, Step 3 for discharging and imparting the upper layer ink to the substrate imparted with the lower layer ink obtained in Step 2 in order to at least partially overlap with the lower layer ink, and Step 4 for irradiating an ultraviolet ray from an ultraviolet lamp to the substrate imparted with the lower layer ink and the upper layer ink obtained in Step 3.

14. A production method of a printed matter which uses the ultraviolet curable inkjet ink set according to claim 7, comprising Step 1 for discharging and imparting the lower layer ink on a substrate, Step 2 for irradiating an ultraviolet ray from an ultraviolet light emitting diode to the substrate imparted with the lower layer ink obtained in Step 1, Step 3 for discharging and imparting the upper layer ink to the substrate imparted with the lower layer ink obtained in Step 2 in order to at least partially overlap with the lower layer ink, and Step 4 for irradiating an ultraviolet ray from an ultraviolet lamp to the substrate imparted with the lower layer ink and the upper layer ink obtained in Step 3.

15. A production method of a printed matter which uses the ultraviolet curable inkjet ink set according to claim 9, comprising Step 1 for discharging and imparting the lower layer ink on a substrate, Step 2 for irradiating an ultraviolet ray from an ultraviolet light emitting diode to the substrate imparted with the lower layer ink obtained in Step 1, Step 3 for discharging and imparting the upper layer ink to the substrate imparted with the lower layer ink obtained in Step 2 in order to at least partially overlap with the lower layer ink, and Step 4 for irradiating an ultraviolet ray from an ultraviolet lamp to the substrate imparted with the lower layer ink and the upper layer ink obtained in Step 3.

16. A production method of a printed matter which uses the ultraviolet curable inkjet ink set according to claim 11, comprising Step 1 for discharging and imparting the lower layer ink on a substrate, Step 2 for irradiating an ultraviolet ray from an ultraviolet light emitting diode to the substrate imparted with the lower layer ink obtained in Step 1, Step 3 for discharging and imparting the upper layer ink to the substrate imparted with the lower layer ink obtained in Step 2 in order to at least partially overlap with the lower layer ink, and Step 4 for irradiating an ultraviolet ray from an ultraviolet lamp to the substrate imparted with the lower layer ink and the upper layer ink obtained in Step 3.

17. The ultraviolet curable inkjet ink set according to claim 1, wherein a content of the 2-hydroxy 1-{1-[4-(2-hydroxy-2-methylpropionyl)phenyl]-1,3,3-trimethylindane-5-yl}-2-methylpropane-1-one contained in the lower layer ink is 2 to 8% by mass based on an entire amount of the lower layer ink.

* * * * *